(12) United States Patent
Iwai et al.

(10) Patent No.: US 7,053,288 B2
(45) Date of Patent: May 30, 2006

(54) MOVING APPARATUS AND MOVING APPARATUS SYSTEM

(75) Inventors: Toshio Iwai, Mitaka (JP); Nobuo Hara, Fukuroi (JP); Masanori Negoro, Shizuoka-ken (JP); Yasuhiko Asahi, Iwata (JP)

(73) Assignees: Yamaha Corporation (JP); Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 11/041,599

(22) Filed: Jan. 24, 2005

(65) Prior Publication Data

US 2005/0211078 A1    Sep. 29, 2005

(30) Foreign Application Priority Data

Jan. 23, 2004  (JP)  ............... 2004-015202

(51) Int. Cl.
*G10H 7/00*  (2006.01)
(52) U.S. Cl. .............. 84/600; 455/344; 280/87.042
(58) Field of Classification Search ............ 84/600; 455/344; 280/87.042, 288.4
See application file for complete search history.

(56) References Cited

U.S. PATENT DOCUMENTS

| 4,043,241 | A |   | 8/1977 | Liu |
| 4,270,764 | A | * | 6/1981 | Yamada ............... 280/87.042 |
| 4,824,139 | A | * | 4/1989 | Robbins .................... 280/816 |
| 5,004,256 | A | * | 4/1991 | Won ....................... 280/87.042 |
| 5,029,661 | A | * | 7/1991 | Wallace et al. ............ 180/165 |
| 5,130,693 | A | * | 7/1992 | Gigandet ............... 340/815.69 |
| D355,946 | S | * | 2/1995 | Park ........................... D21/765 |
| 5,737,247 | A | * | 4/1998 | Baer et al. .................. 702/149 |
| 6,050,357 | A | * | 4/2000 | Staelin et al. .............. 180/65.1 |
| 2003/0076968 | A1 | * | 4/2003 | Rast ............................ 381/124 |
| 2004/0170288 | A1 |   | 9/2004 | Maeda |

FOREIGN PATENT DOCUMENTS

JP    2970494 B    8/1999

OTHER PUBLICATIONS

U.S. Appl. No. 11/041,720, Iwai et al., rel. co-pending app.

* cited by examiner

*Primary Examiner*—Jeffrey W Donels
(74) *Attorney, Agent, or Firm*—Rossi, Kimms & McDowell, LLP

(57) ABSTRACT

A skateboard has a board that is rotatably provided with a front wheel and rear wheel. Disposed on the both sides of the board are speakers. On the front wheel there is provided a steering angle sensor, while on the rear wheel there is provided a rotational speed sensor in order to sense the traveling direction and traveling speed of the skateboard. A control box disposed on the undersurface of the board is equipped with a computer device and tone generator. The computer device controls, in accordance with the traveling direction and speed of the skateboard, the performance tempo of automatic rhythm and automatic performance, the switching between automatic rhythm patterns, and the generation of musical tone signals. The present invention brings more fun to a player without making the player tired by adding variation to music to which the player listens during the ride on the moving apparatus in accordance with the movement of the moving apparatus.

28 Claims, 16 Drawing Sheets

(A)

(B)

MOVING APPARATUS AND MOVING APPARATUS SYSTEM

BACKGROUND OF THE INVENTION

1. Field of the Invention

The present invention relates to a moving apparatus which a human being can ride to move by motor-power or human-power and a system for the moving apparatus.

2. Description of the Related Art

Conventionally, many people enjoy riding a moving apparatus such as a skateboard while listening to music emitted from a radio, tape recorder or the like. Furthermore, in JP2970494B, for example, there is disclosed a musical apparatus, a player of which wears controllers on his/her hands and shoulders for sensing the movements of his/her hands and shoulders, and has a plurality of pressure sensors in his/her shoes. The musical apparatus is designed to control musical tones to be generated in accordance with the movements of his/her hands and shoulders sensed by the controllers and stepping forces sensed by the pressure sensors. With this musical apparatus, the player can play music by moving his/her hands and feet.

However, in the former related art, in which music is completely separated from the moving apparatus, people merely ride on the moving apparatus to move while listening to music. In the latter related art, furthermore, the player needs to focus on his/her performance, missing an opportunity to enjoy additional fun such as sporting taste and entertainment value.

SUMMARY OF THE INVENTION

The present invention was accomplished to solve the above-described problems, and an object thereof is to provide a moving apparatus and moving apparatus system which bring more fun to a player without making the player tired by adding variation to music to which the player listens during the ride on the moving apparatus in accordance with the movement of the moving apparatus.

In order to achieve the above-described object, a feature of the present invention lies in a moving apparatus which a human can ride to move, the moving apparatus comprising a musical tone signal generating portion for generating a musical tone signal, a movement sensing portion for sensing the movement of the moving apparatus and a generation mode controlling portion for controlling a mode in which the musical tone signal is generated by the musical tone signal generating portion in accordance with the sensed movement. The moving apparatus moves by motor-power or human-power.

Another feature of the present invention lies in a moving apparatus system having a moving apparatus which a human can ride to move and an electronic musical apparatus which is disposed apart from the moving apparatus and includes a musical tone signal generating portion for generating a musical tone signal, wherein the moving apparatus is provided with a movement sensing portion for sensing the movement of the moving apparatus and a transmitting portion for transmitting a signal indicative of the sensed movement, and the electronic musical apparatus is provided with a generation mode controlling portion for receiving the signal transmitted from the transmitting portion and controlling, on the basis of the received signal, a mode in which the musical tone signal is generated by the musical tone signal generating portion in accordance with the sensed movement. The moving apparatus moves by motor-power or human-power.

In these cases, for example, the movement of the moving apparatus is operated by human operation, shifting of weight or the like. The moving apparatus may travel by rotation of a wheel (tire) or slide on snow, ice or the like. Furthermore, the moving apparatus may have any moving means for traveling by use of motor-power, human-power, gravity or the like. The movement of the moving apparatus to be sensed may indicate the physical quantity relating to the speed or traveling direction of the moving apparatus. More specifically, the movement of the moving apparatus includes the steering angle, forward and backward acceleration, lateral acceleration, forward and backward speed, lateral speed, traveling direction, angle speed, and so on.

Furthermore, the musical tone signal generating portion may automatically generate a series of musical tone signals on the basis of a series of performance data, and the generation mode controlling portion may change a mode in which the series of musical tone signals are generated in accordance with the sensed movement. In this case, the mode to be changed includes the tempo of performance in which the series of musical tone signals are automatically generated, in other words, the tempo of automatic performance (automatic performance such as melody, accompaniment and rhythm) and the switching between performance data (melody, accompaniment, rhythm) formed of a series of performance data. Moreover, the generation mode controlling portion may control, on the basis of the sensed movement, the generation of a musical tone signal by the musical tone signal generating portion or a musical tone element of the musical tone signal generated by the musical tone signal generating portion. In this case, the musical tone element includes the tone pitch, tone color and volume (amplitude envelope) of a musical tone signal as well as the effect to be added to the musical tone signal.

According to the present invention, when a player rides the moving apparatus to move, the movement sensing portion senses the movement of the moving apparatus, so that the generation mode controlling portion variously controls the mode in which musical tone signals are generated in accordance with the sensed movement. As a result, the present invention enables the player to add variation to music to which the player listens during the ride on the moving apparatus in accordance with the movement of the moving apparatus, bringing more fun to the player without making the player tired. In addition, the present invention also enables the player to play music by changing the movement of the moving apparatus.

BRIEF DESCRIPTION OF THE DRAWINGS

FIG. 11(A) is a schematic sketch in which a player riding the skateboard is viewed from the front, while FIG. 11(B) is a schematic sketch in which the player is viewed from the left;

DESCRIPTION OF THE PREFERRED EMBODIMENT a. First Embodiment

Figure 1:
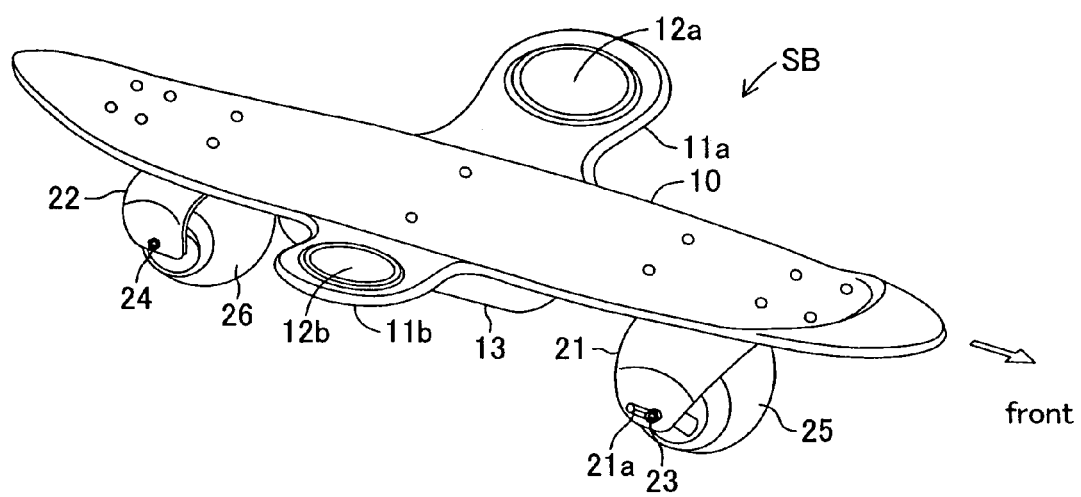
FIG. 1 is a perspective view showing the whole of a skateboard according to a first embodiment of the present invention.

A first embodiment of the present invention will now be described with reference to the drawings. FIG. 1 is a perspective view of a skateboard SB shown as an example of a moving apparatus of the present invention.

The skateboard SB has a plate-shaped board 10 having a long length in the front and rear direction. The skateboard SB is formed of a hard material such as lumber or synthetic resin (e.g., FRP). In FIG. 1 and later-discussed FIG. 2, the skateboard moves in the direction (rightward) shown by an arrow. At the right and left sides of the midsection in the front and rear direction of the board 10, integrally formed with the board 10 are a plate-shaped pair of projections 11a, 11b extending from the board 10 diagonally upward to the right and left. The projections 11a, 11b are provided with speakers 12a, 12b, respectively, in order to emit tones upward. Although the speakers 12a, 12b may have low directivity, the speakers 12a, 12b with high directivity are preferable. On the undersurface of the midsection in the front and rear direction of the board 10 there is provided a control box 13 for controlling the driving of the skateboard SB and generation of musical tones.

Figure 2:
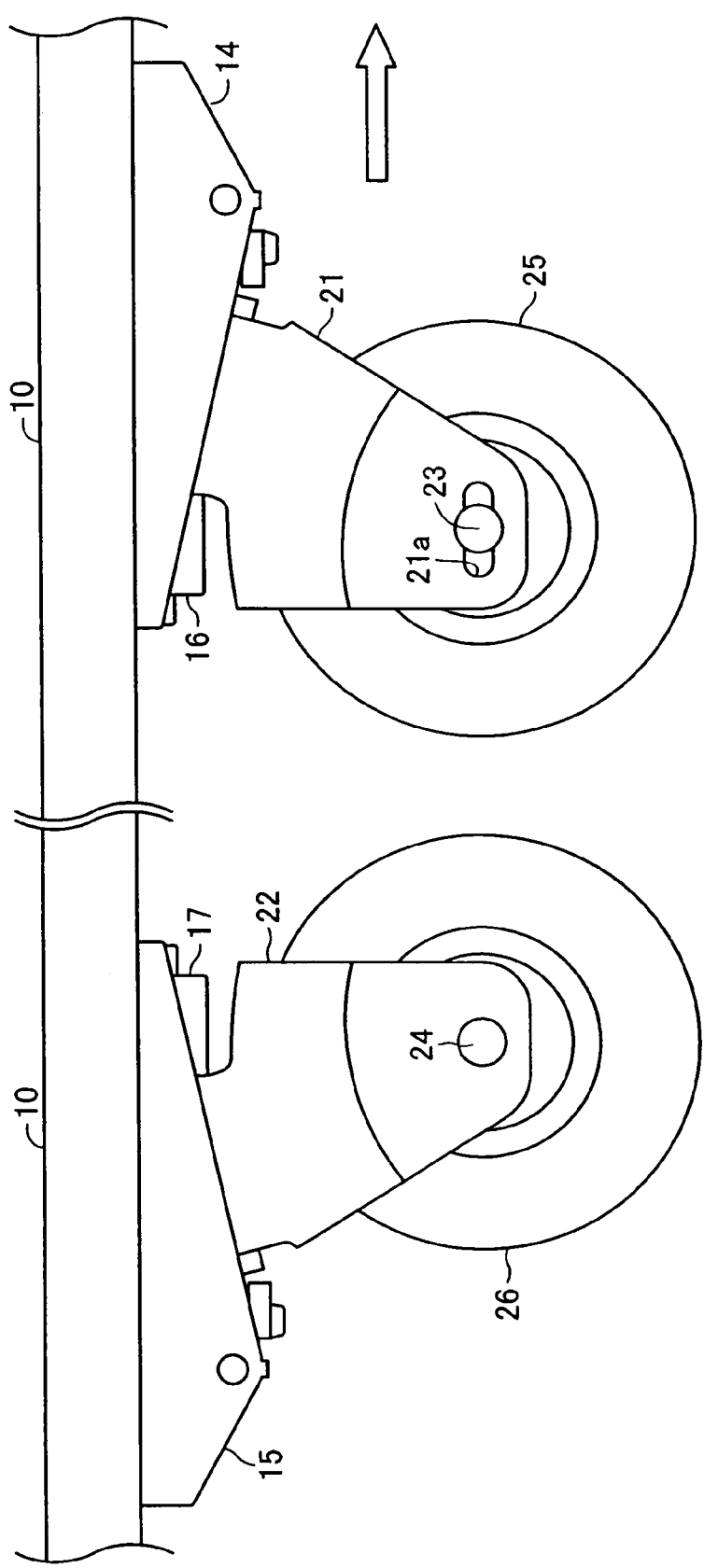
FIG. 2 is a side view showing the front and rear of the skateboard.

Provided on the undersurface of the front and rear of the board 10, respectively, as shown in FIGS. 1 and 2 are arms 21, 22 that are open downward and shaped like a letter U in cross section, with a pair of first frames 14, 15 and a pair of second frames 16, 17 disposed therebetween. The arms 21, 22 rotatably support a front wheel 25 and rear wheel 26, with a pair of fixing screws 23, 24 disposed at the right and left sides. The front wheel 25 and rear wheel 26 have a tire formed of elastically deformable rubber or resin in an approximately cylindrical shape. When viewing the sectional surface including the rotation axis line, the outer surface of the tire has an arc-shape at the right and left edges (see FIG. 5). At the right and left sides of the arm 21 of the front wheel 25 there are formed slits 21a respectively extending in the front and rear direction. Due to the slits 21a, the position in the front and rear direction where the fixing screw 23 is fixed to the arm 21 is left adjustable, in other words, the position in the front and rear direction where the front wheel 25 is fixed to the arm 21 is left adjustable. The adjustment of fixing position allows a change in distance in the front and rear direction between the rotation axis of the front wheel 25 and the rotation axis of the rear wheel 26, making the cornering ability of the skateboard SB adjustable.

Figure 3:
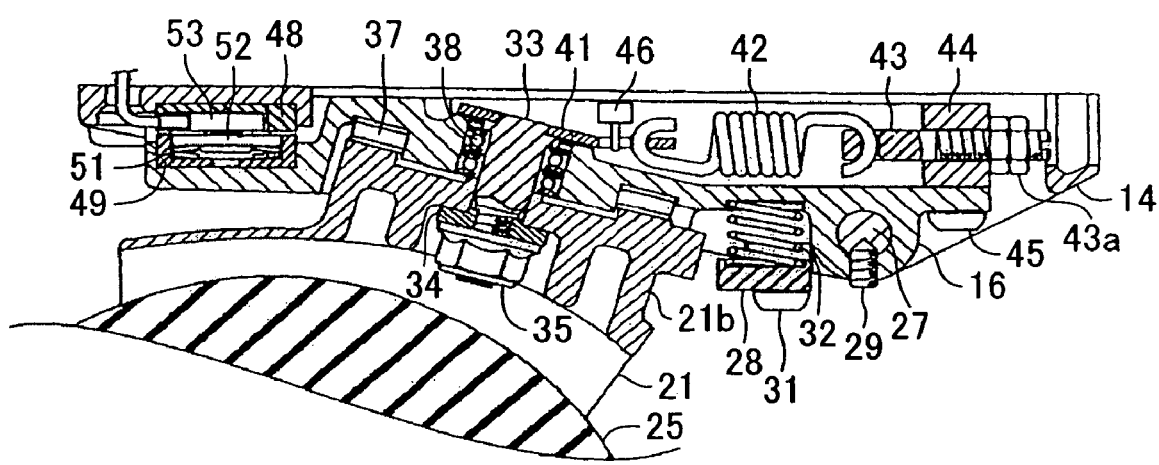
FIG. 3 is a sectional view in which the skateboard is cut along the front and rear direction to show how an arm is fixed to a board.
Figure 4:
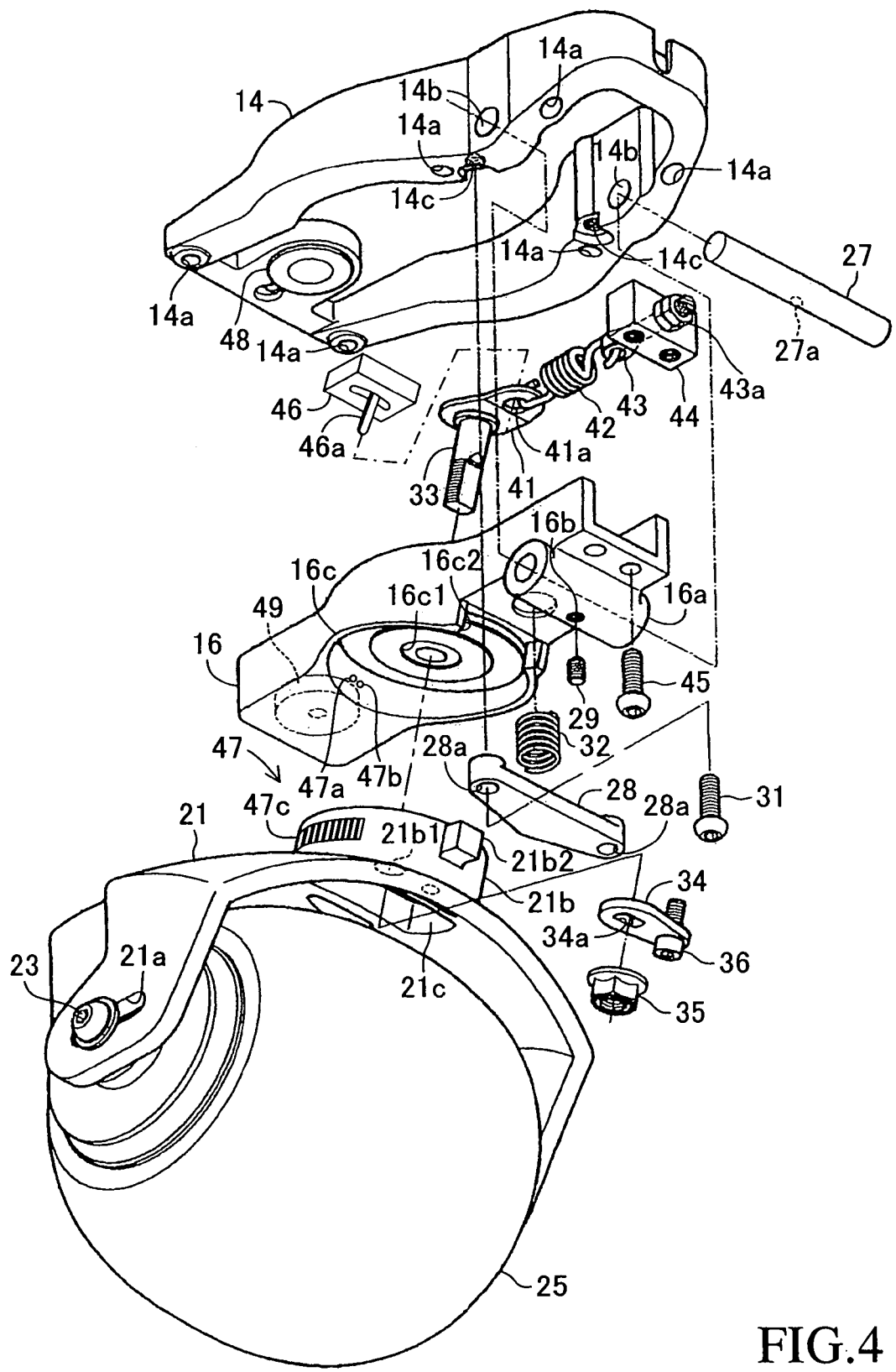
FIG. 4 is an exploded perspective view showing how the arm is fixed to the board.

Next explained will be how the arms 21, 22 of the front wheel 25 and rear wheel 26 are fixed to the board 10. Both the arms 21, 22 are fixed to the board 10 in the same manner except the placement in the front and rear direction, therefore, only how the arm 21 of the front wheel 25 is fixed to the board 10 will be explained in detail. FIG. 3 is a sectional view in which the board 10 is cut along the front and rear direction to show how the arm 21 is fixed to the board 10. FIG. 4 is an exploded perspective view showing how the arm 21 is fixed to the board 10.

The first frame 14 is formed to have a hollow horseshoe shape. At the projection of the first frame 14 there are formed a plurality of (six in the present embodiment) holes 14a that are vertically drilled through. The first frame 14 is fixed to the undersurface of the board 10 with a screw which is not shown. At both the right and left sides of the first frame 14 there are also formed a pair of holes 14b, 14b that are horizontally drilled through. The second frame 16 is shaped like a letter U in cross section and formed to have a long length in the front and rear direction. The second frame 16 is fit in the inner surface of the first frame 14. On the undersurface of the front of the second frame 16 there is integrally formed a sleeve 16a that extends in the horizontal direction. In a state where the second frame 16 is fit in the first frame 14, when a columnar connecting shaft 27 is pierced through the holes 14b, 14b formed on the first frame 14 and the sleeve 16a, the second frame 16 is supported by the first frame 14 to be oscillatable about the axis line of the connecting shaft 27. On the underside of the sleeve 16a there is formed an internal thread 16b that is drilled through, while on the outer surface of the connecting shaft 27 there is formed a bottomed hollow 27a. To prevent the connecting shaft 27 from slipping off, there is provided an external thread 29 that is inserted to the hollow 27a through the internal thread 16b.

On the underside of the second frame 16 there is provided a long holder 28 that horizontally straddles the second frame 16 so as to be mounted to the first frame 14 with a pair of external threads 31, 31 (only one of them is shown). These external threads 31, 31 pass through a pair of penetrated holes 28a, 28a from below upward provided at the both edges of the holder 28 to be engaged with a pair of internal threads 14c, 14c provided on both the right and left sides of the first frame 14. This structure curbs the above-described downward oscillation of the rear of the second frame 16 about the axis line of the connecting shaft 27. Between the upper surface of the holder 28 and the undersurface of the second frame 16 there is provided a compression spring 32 whose axis line direction is vertical. This compression spring 32 reduces impact exerted on the second frame 16 from the front wheel 25.

At the midsection in the front and rear direction of the second frame 16 there is formed a rotation supporting part 16c having a columnar concave portion on the undersurface thereof. Housed in the columnar concave portion is a columnar rotating portion 21b that is integrally formed at the midsection of the upper surface of the arm 21, the rotating portion 21b being rotatable about the axis line. At the midsection of the rotation supporting part 16c there is formed a penetrated hole 16c1, while at the midsection of the rotating portion 21b there is also formed a round penetrated hole 21b1. Passed through these penetrated holes 16c1, 21b1 from above downward is a columnar rotational axis 33. The upper part of the rotational axis 33 that faces the inner surface of the penetrated holes 16c1, 21b1 is shaped like a column, however, the side surfaces of the lower part of the rotational axis 33 that is positioned below the penetrated hole 21b1 are cut off in the axis line direction to form a pair of parallel side surfaces, with an external thread being formed on a pair of remaining arc-shaped side surfaces. Mounted to the lower part of the rotational axis 33 is a plate 34 having a fitting hole 34a whose shape agrees with the section of the lower part. The plate 34 is unrotatably fitted into a concave portion 21c having a rectangular shape that is formed on the undersurface of the upper wall of the arm 21. By engaging the lower part of the rotational axis 33 with a nut 35 from beneath the plate 34, the rotational axis 33 is integrally rotatably fixed to the arm 21. The plate 34 is fastened to the bottom face of the concave portion 21c of the arm 21 with an external thread 36.

Due to the above-described structure, the rotational axis 33 rotates integrally with the arm 21 about its axis line. In order to facilitate the rotation, provided in between the top surface of the rotating portion 21b and the undersurface (ceiling) of the rotation supporting part 16c of the second frame 16 is a bearing 37, while in between the upper part of the rotational axis 33 and inner surface of the penetrated hole 16c1 of the rotation supporting part 16c of the second frame 16 there is provided a bearing 38. On the side of the rotating portion 21b of the arm 21 there is formed a protrusion 21b2, while a notch 16c2 having a specified width is formed on part of the side wall of the rotation supporting part 16c that houses the rotating portion 21b. When the rotation supporting part 16c houses the rotating portion 21b, the protrusion 21b2 protrudes outward from the notch 16c2, so that the bumping of the protrusion 21b2 against the edges of the side wall of both sides of notch 16c2 limits the rotational range of the arm 21.

The upper end of the rotational axis 33 is secured to an end of a connecting plate 41 by welding. The other end of the connecting plate 41 is connected to an end of a connecting rod 43, with a tension spring 42 provided in between. The rod 43 slidably passes through a penetrated hole provided on a fixed member 44, and is movably engaged with the fixed member 44 by the threaded engagement between an internal thread provided on the other end of the connecting rod 43 and a nut 43a. The fixed member 44 is fixed to the second frame 16 by a pair of external threads 45, 45 (only one of them is shown) that are inserted from the front edge of the undersurface of the second frame 16. The above-described connecting plate 41, tension spring 42, connecting rod 43 and fixed member 44 are displaceably housed in a concave portion provided at the front of the second frame 16. The tension of the tension spring 42 can be adjusted by adjusting the position of the connecting rod 43 in the axis line direction, so that the rotational characteristics of the rotational axis 33, that is, the steering characteristics of the front wheel 25 can be adjusted.

Into a hole 41a of the connecting plate 41 to which an end of the tension spring 42 is fastened there is slidably inserted a movable element 46a of a potentiometer that is a component of a steering angle sensor 46. The main body of the steering angle sensor 46 is fixed to the undersurface of the board 10. The movable element 46a is rotationally displaced by the rotation of the rotational axis 33 and connecting plate 41, so that the steering angle sensor 46 outputs a voltage signal that corresponds to the rotationally displaced position of the movable element 46a. The voltage signal represents a rotational angle of the rotational axis 33, that is, a steering angle θ of the front wheel 25, therefore, hereinafter the voltage signal will be referred to as a steering angle signal. When the front wheel 25 is in a neutral state (that corresponds to a later-described straight-ahead state of the skateboard SB), the steering angle θ indicates "0". In a state where the front wheel 25 is steered to the left (that corresponds to a later-described left cornering state of the skateboard SB), the steering angle θ becomes negative, and the absolute value of the steering angle θ indicates the amount of steering in the left direction. In a state where the front wheel 25 is steered to the right (that corresponds to a later-described right cornering state of the skateboard SB), the steering angle θ becomes positive, and the absolute value of the steering angle θ indicates the amount of steering in the right direction.

Instead of the steering angle sensor 46, a steering angle sensor 47 provided on the second frame 16 and the arm 21 may be used. The steering angle sensor 47 is composed of a light-emitting element 47a and a light-receiving element 47b that are embedded in the inner surface of the rotation supporting part 16c of the second frame 16 to oppose to the outer surface of the rotating portion 21b of the arm 21, and a striped reflector 47c provided on the outer surface of the rotating portion 21b. In the steering angle sensor 47, light emitted by the light-emitting element 47a is reflected by the reflector 47c and received by the light-receiving element 47b. The steering angle sensor 47 is designed such that when the rotating portion 21b is rotated, the amount of light received by the light-receiving element 47b varies in accordance with the stripe of the reflector 47c so as to change a counted value in response to the change in the amount of received light. As a result, the resultant counted value indicates a steering angle θ. In this case, it is necessary to conduct a zero-point correction of the steering angle by clearing the counted value to "zero" in a state where the arm 21 and front wheel 25 are positioned in neutral. Instead of the above-described steering angle sensor which uses light, furthermore, a magnetic steering angle sensor which uses magnetic pulse train may be employed. Such steering angle sensor may be designed such that magnetic pulse train signals are generated by combination of an electromagnetic pick-up and a plurality of magnets opposing to the electromagnetic pick-up. The above-described steering angle sensor may be modified such that the magnetic permeability of the electromagnetic pick-up and the portion opposing to the electromagnetic pick-up varies at specified intervals to generate magnetic pulse train signals.

At the undersurface of the rear part of the first frame 14 there is formed a circular concave portion. Fitted into the concave portion is a bottomed cylindrical holder 48 having an opening in the lower part thereof. On the upper surface of the second frame 16 as well there is formed a circular concave portion that opposes to the holder 48. Into the concave portion there is fitted a bottomed cylindrical holder 49 having an opening in the upper part thereof. Between the holders 48, 49, there are provided a coned disc spring 51, a plate 52 and a load sensor 53 that are placed in this order from the bottom. The coned disc spring 51 alleviates impact propagated from the front wheel 25 through the second frame 16 and first frame 14. The plate 52, which is made of aluminum, is contacted with the load sensor 53. The load sensor 53 senses a load W1 imposed from the board 10 through the first frame 14 to the second frame 16, and outputs a load signal representative of the sensed load W1. Used as the load sensor 53 is a load cell, for example, however, any sensor can be used as far as it is able to sense a load.

Figure 5:
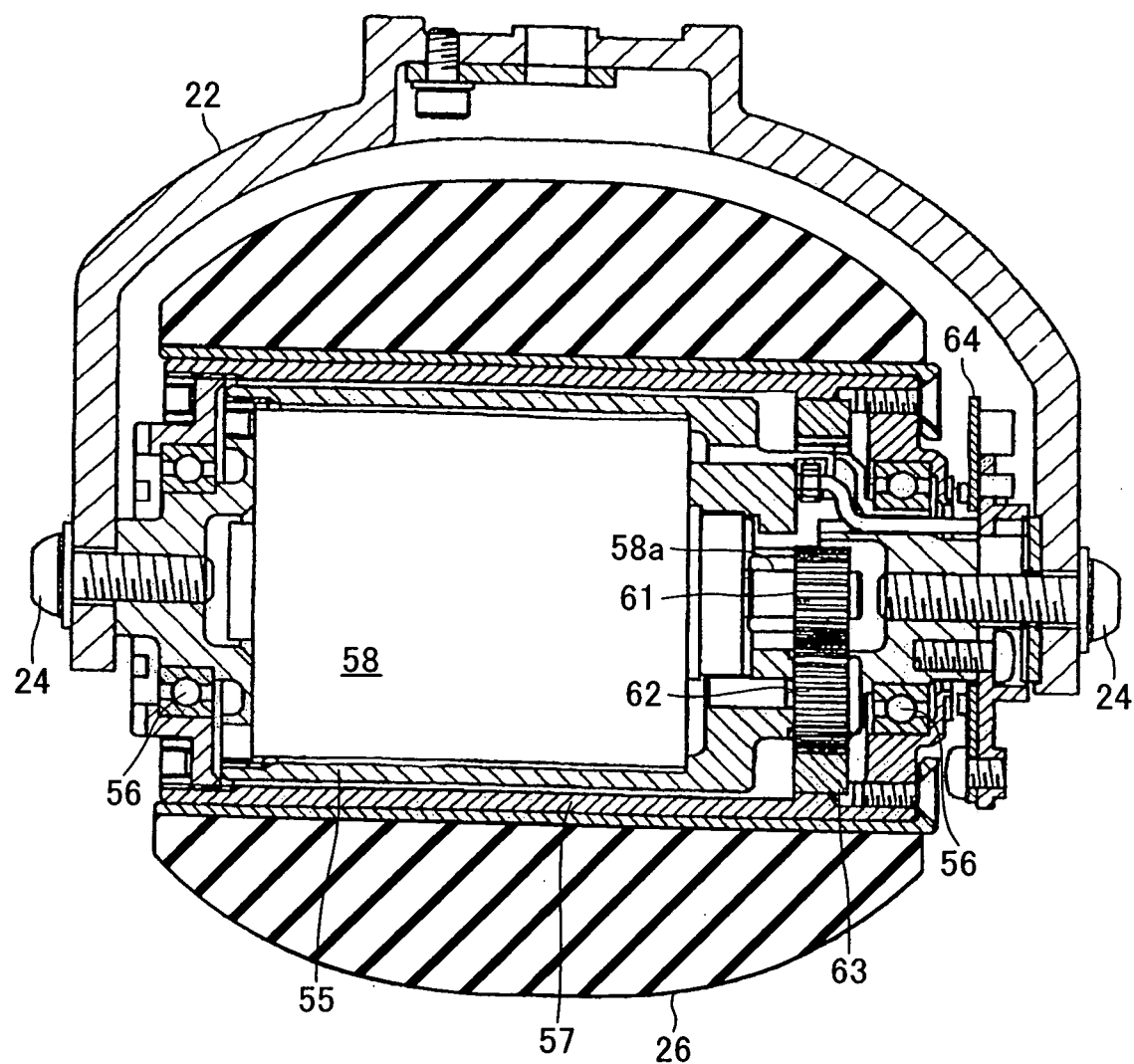
FIG. 5 is a longitudinal sectional view of a rear wheel which is a drive wheel of the skateboard.

Next explained with reference to longitudinal sectional view of FIG. 5 will be a drive mechanism for rotating and driving the rear wheel 26 which is a drive wheel. At the inside of the arm 22 of the rear wheel 26, a fixing sleeve 55 is fixed by the fixing screws 24 and an axis line of the fixing sleeve 55 is in a horizontal direction. On the outer surface of the fixing sleeve 55 a rotational sleeve 57 is rotatably supported through bearings 56, 56. On the outer surface of the rotational sleeve 57 the rear wheel 26 is mounted to rotate integrally with the rotational sleeve 57. The tire of the rear wheel 26 is made of the same material as that of the front wheel 25 to have the same shape as the front wheel 25. In the fixing sleeve 55 a motor 58 is housed. To a rotational axis 58a of the motor 58 a drive gear 61 is fixed to integrally rotate. The drive gear 61 is engaged through a mid-gear 62 with an internal gear 63 that is fixed on the inner surface of the rotational sleeve 57 to integrally rotate and used as an output gear. As a result, the rotation of the motor 58 brings the rear wheel 26 to rotate and drive. Also mounted on the arm 22 is a rotational speed sensor 64 which senses the rotation of the rotational sleeve 57 and has an encoder for outputting a rotational speed signal representative of rotational speed V of the rear wheel 26. The rotational speed sensor 64 may be replaced with such rotational speed sensor as picks up the rotation of the gear and outputs a rotational speed signal representative of rotational speed V.

As described above, furthermore, the arm 22 of the rear wheel 26 is mounted to the undersurface of the rear part of the board 10, with the first and second frames 15, 17 interposed therebetween as in the case of the arm 21 of the front wheel 25. Between the first and second frames 15, 17 a load sensor 65 is mounted which is similar to the load sensor 53 of the front wheel 25. The load sensor 65 outputs a load signal representative of a load W2 imposed to the rear part of the board 10. To the rear wheel 26, however, any steering angle sensor such as the steering angle sensor 46 of the front wheel 25 is not mounted.

Figure 6:
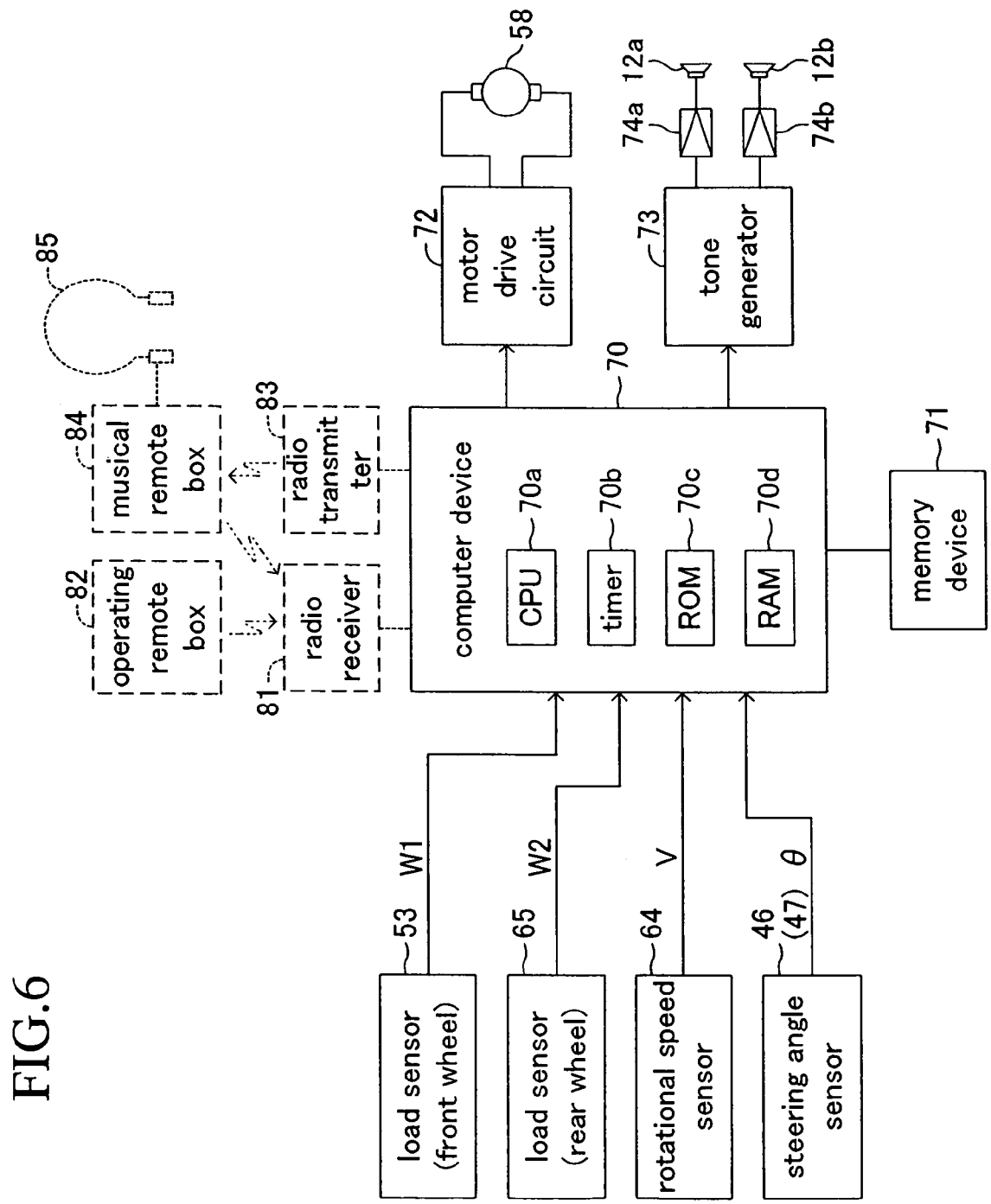
FIG. 6 is a circuit block diagram showing an electrical control device of the skateboard.

Next explained will be an electrical control device contained in the control box 13. As shown in FIG. 6, the electrical control device includes a computer device 70 that is connected with the load sensors 53, 65, the rotational speed sensor 64, and the steering angle sensor 46 (or 47). The computer device 70 is composed of a microcomputer that is equipped with a CPU 70a, timer 70b, ROM 70c and RAM 70d. In FIG. 6, a battery for supplying power to the respective electric circuits is not shown. Connected with the computer device 70 are a memory device 71, motor drive circuit 72 and tone generator 73.

The memory device 71 includes a nonvolatile memory such as an EEPROM or flash memory. The memory device 71 stores various programs including a drive control program shown in FIG. 7, a performance tone setting program shown in FIG. 8, and a performance tone process program shown in FIG. 9 as well as various data including music data for generating musical tones. The music data include pairs of automatic rhythm data and automatic performance data as shown in FIG. 10(A), and a beat tone data group and effect tone data group as shown in FIG. 10(B). The automatic rhythm data instructs the generation of rhythm tones (generally, percussion tones) in accordance with the passage of time to realize automatic rhythm. Each set of automatic rhythm data is formed of sets of rhythm pattern data for a specified number of bars (a bar in the case of the present embodiment). Provided for the present embodiment are a set of normal pattern data specified by the pattern number 8, sets of variation pattern data specified by the pattern numbers 1 to 7, and 9 to 15, and a set of ending pattern data specified by the pattern number 16. However, the number of sets of available pattern data is not limited to that of the present embodiment. In each set of the pattern data, which instructs the generation of rhythm tones in associated relation with a tempo clock value TCL, there are disposed, in time sequence, sets of rhythm tone control data which specifies a type of rhythm tone. The tempo clock value TCL is a value to be automatically counted up to a specified value (e.g., "192") by "1" from "0" at a speed specified by tempo data TMP representative of a performance tempo by the execution of the performance tone process program shown in FIG. 9 in order to indicate timings in each bar of a musical piece.

In the automatic performance data, which instructs the generation of musical tones having a tone pitch in accordance with the passage of time to realize automatic performance such as melody and accompaniment tones, there are disposed, in time sequence, sets of musical tone control data for a musical piece in associated relation with a bar count value BAR and the tempo clock value TCL. The musical tone control data is the data which specifies the start and end of the generation of a musical tone, the tone pitch of a musical tone, the tone color of a musical tone, etc. At the end of a set of automatic performance data there is disposed end data. The bar count value BAR indicates the position of a bar that is currently being performed in a musical piece. The beat tone data group contains sets of musical tone control data including waveform data necessary to generate beat tones such as cymbal tones and drum tones that are emitted at the switching between rhythm patterns. The effect tone data group contains musical tone control data including waveform data necessary to generate special tones such as "zing" and "whew".

The motor drive circuit 72 drives and controls the motor 58 under the control of the computer device 70. The tone generator 73 generates musical tone signals and outputs the generated tone signals to speakers 12a, 12b through amplifiers 74a, 74b on the basis of instructions given by the computer device 70.

Figure 11:
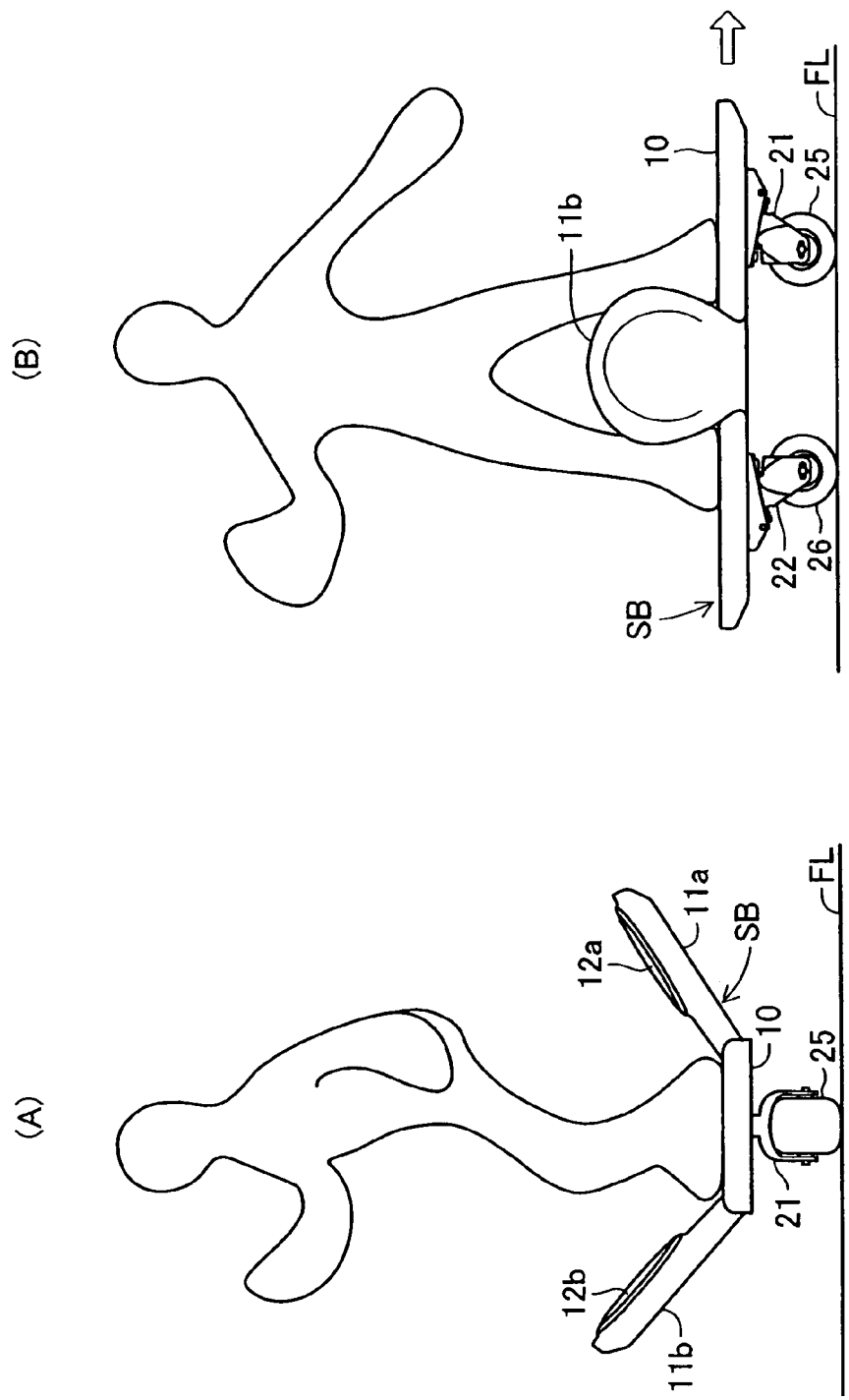

The operation of a first embodiment configured as described above will be explained. After turning on a power switch that is disposed on the control box 13 but is not shown and conducting later-described operations such as selecting a musical piece, a player rides on the board 10 as shown in FIG. 11(A), (B). FIG. 11(A) is a schematic sketch in which the player riding the board 10 is viewed from the front, while FIG. 11(B) is a schematic sketch in which the player is viewed from the right. In this state, the player moves his/her body to shift the center of gravity of his/her body from mid-above the board 10 to the front or rear, or the right or left.

Figure 7:
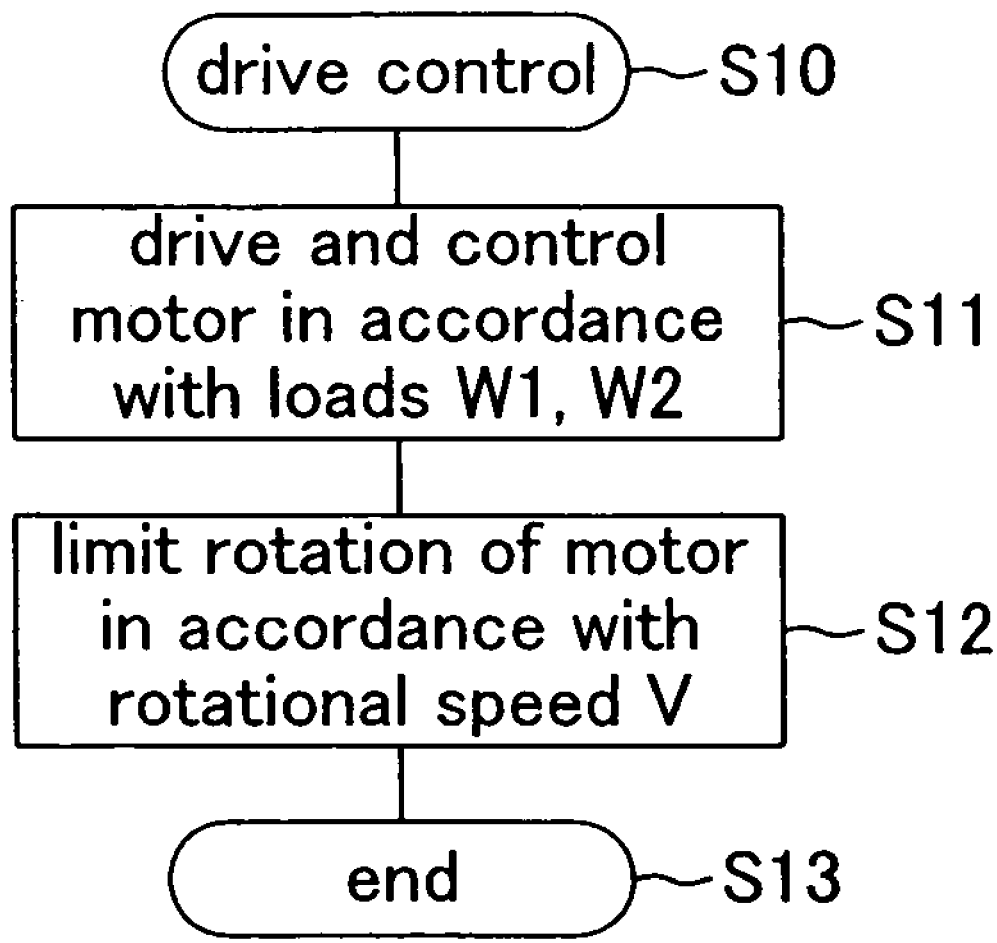
FIG. 7 is a flowchart showing a drive control program executed by a computer device shown in FIG. 6.
Figure 8:
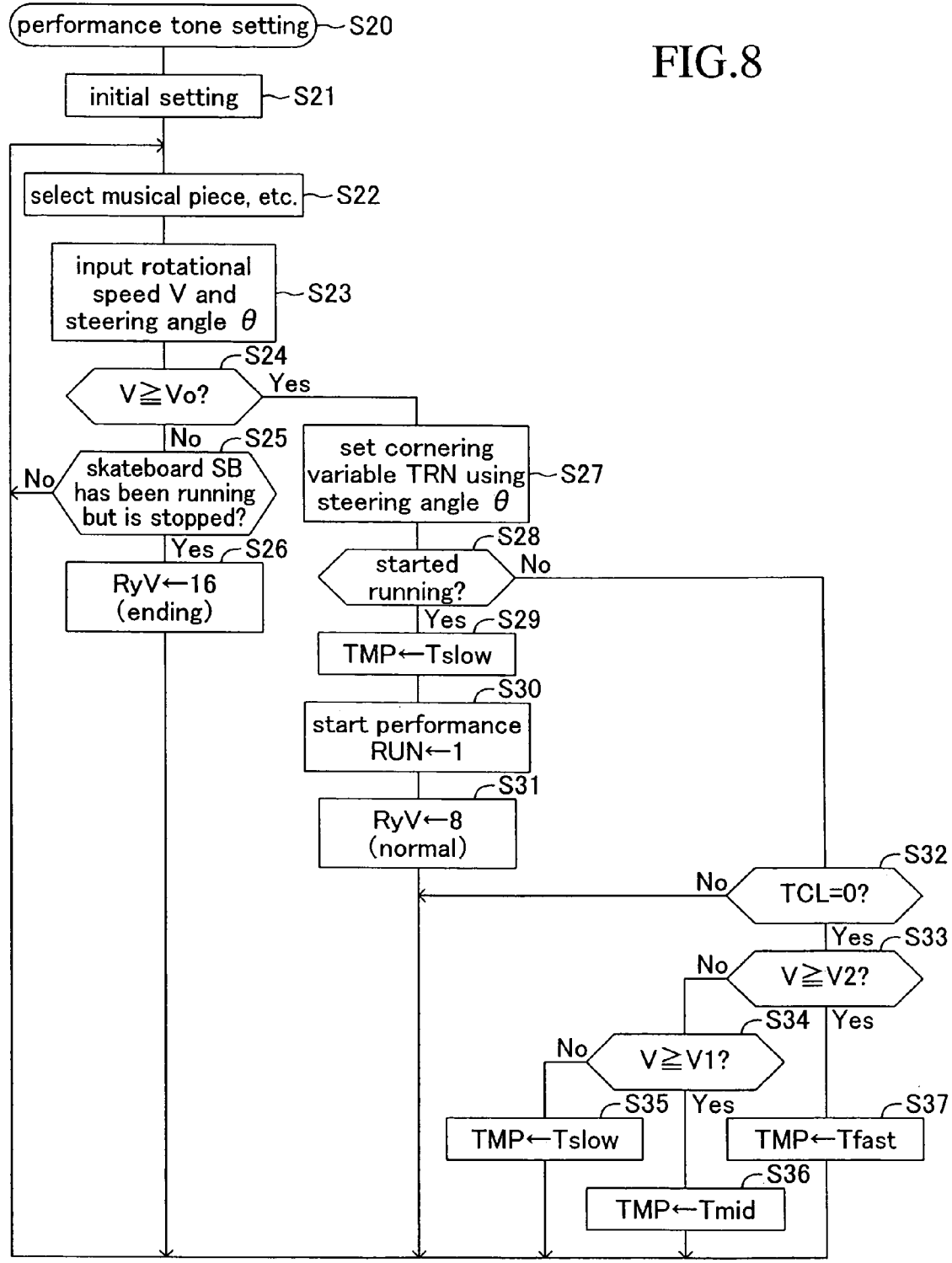
FIG. 8 is a flowchart showing a performance tone setting program executed by the computer device shown in FIG. 6.

At this state, the computer device 70 repeatedly executes the drive control program shown in FIG. 7 at established short periods. The drive control program is started at step S10, and the computer device 70 inputs, at step S11, the loads W1, W2 sensed by the load sensors 53, 65 respectively to drive and control the motor 58 in accordance with the input loads W1, W2. However, since the input loads W1, W2 are not digitized values directly applicable to the computer device 70, an interface circuit provided in the computer device 70 converts the loads W1, W2 into digitized values that are directly applicable to the computer device 70. On the drive control of the motor 58, when the center of gravity of the player's body is placed mid-above the board 10, the loads W1, W2 are equal, so that the computer device 70 controls the motor 58 to stop. When the player shifts the center of gravity of his/her body toward the front from the center of the board 10, the load W1 becomes larger than the load W2, so that the computer device 70 drives the motor 58 forward, resulting in the forward rotation of the rear wheel 26. Since the forward rotation of the rear wheel 26 is designed to bring about the forward movement of the skateboard SB, the skateboard SB moves forward. When the player shifts the center of gravity of his/her body toward the rear from the center of the board 10, on the other hand, the load W2 becomes larger than the load W1, so that the computer device 70 drives the motor 58 backward. Since the backward rotation of the motor 58 brings about the backward rotation of the rear wheel 26, the skateboard SB moves backward.

At the forward movement and backward movement of the skateboard SB, furthermore, supplied to the motor 58 is a driving current of an amount that increases with the increase in the absolute value of the difference between the loads W1, W2. Therefore, the more forward the player shifts the center of gravity of his/her body, the more rapid acceleration the skateboard SB gains to move forward. The more backward the player shifts the center of gravity of his/her body, the more rapid acceleration the skateboard SB gains to move backward. As explained above, by shifting the center of gravity of the body forward or backward, the player can move the skateboard SB forward or backward at a desired speed or stop the skateboard SB.

After step S11, at step S12 the computer device 70 inputs a rotational speed V sensed by the rotational speed sensor 64, and limits the rotation of the motor 58 when the rotational speed V is larger than a predetermined value. The limited rotation of the motor 58 keeps the forward speed and backward speed of the skateboard SB within a predetermined speed to secure the player's safety. After step S12, the drive control program is terminated at step S13.

Figure 12:
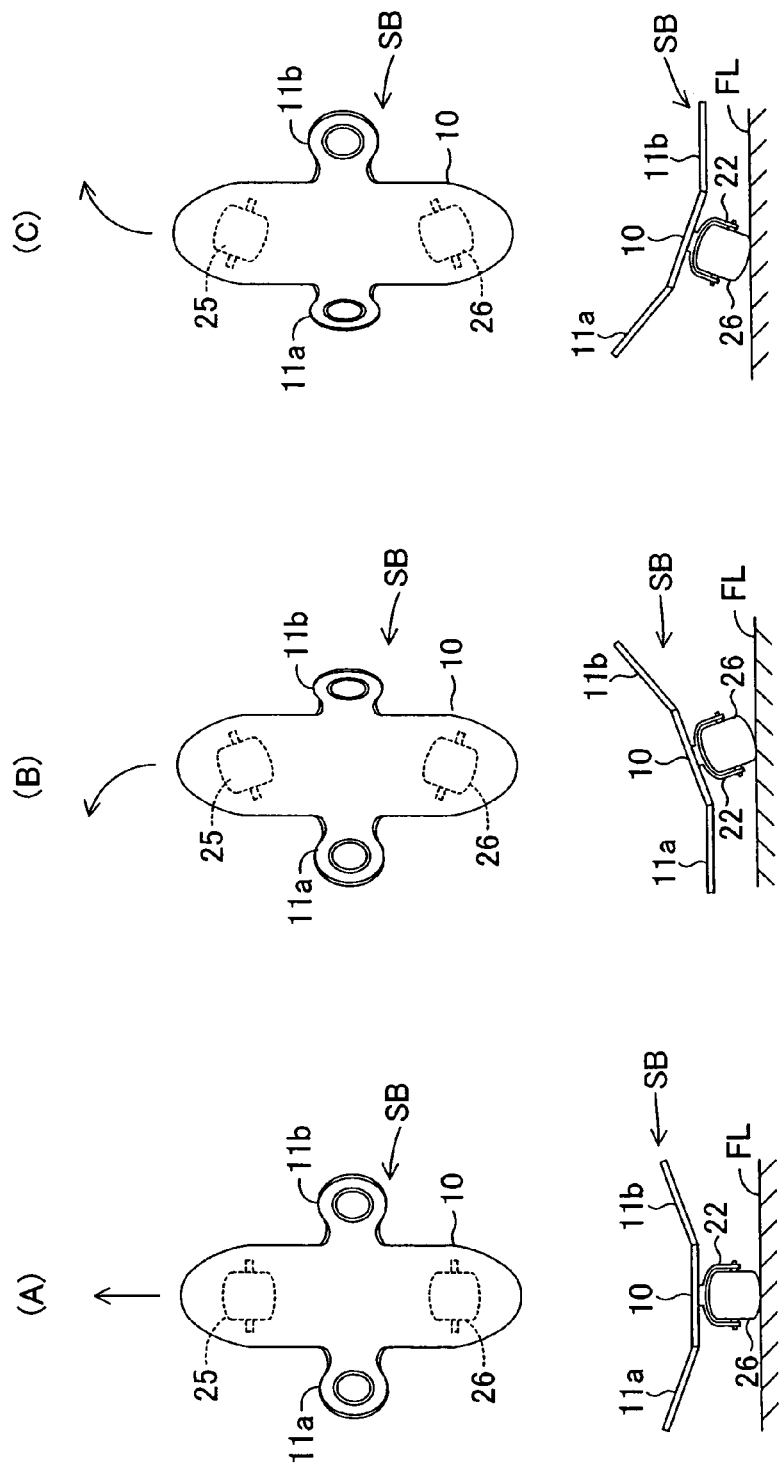
FIG. 12(A) is a diagrammatic sketch of the skateboard viewed from above and rear when moving straight ahead.
FIG. 12(B) is a diagrammatic sketch of the skateboard viewed from above and rear when turning to the left.
FIG. 12(C) is a diagrammatic sketch of the skateboard viewed from above and rear when turning to the right.

Next explained will be cornering of the running skateboard SB. To turn the skateboard SB, the player shifts his/her weight horizontally with respect to the board 10 by twisting his/her body or the like to tilt the board 10 to the right or left. FIGS. 12(A) to (C) are diagrammatic sketches in which the board 10, front wheel 25 and rear wheel 26 are viewed from above and the rear when the skateboard SB moves straight ahead, turns to the left, and turns to the right, respectively. When the player places the center of gravity of his/her body horizontally at the center of the board 10, the rotational axis 33 is positioned in neutral, so that the central part of the front wheel 25 and rear wheel 26 contacts a floor FL (see FIG. 12(A)). In this case, the skateboard SB moves straight ahead.

When the player shifts the center of gravity of his/her body to the left of the board 10, on the other hand, the left part of the front wheel 25 and rear wheel 26 contacts the floor FL (see FIG. 12(B)). In this case, the rotational axis of the front wheel 25 rotates to the left with respect to the first and second frames 14, 16 when viewed from above, so that the front wheel 25 is steered to the left, whereas the rear wheel 26 is steered in the direction opposite to the front wheel 25. As a result, the skateboard SB is turned to the left, with the left side of the board 10 positioned as the center of rotation. When the player shifts the center of gravity of his/her body to the right of the board 10, the right part of the front wheel 25 and rear wheel 26 contacts the floor FL (see FIG. 12(C)). In this case, the rotational axis of the front wheel 25 rotates to the right with respect to the first and second frames 14, 16 when viewed from above, so that the front wheel 25 is steered to the right, whereas the rear wheel 26 is steered in the direction opposite to the front wheel 25 in this case as well. As a result, the skateboard SB is turned to the right, with the right side of the board 10 positioned as the center of rotation.

As described above, the skateboard SB is turned to the right or left by the horizontal shift of the player's weight. The larger the amount of the horizontal shift of the player's weight becomes, the further outward the part of the front wheel 25 and rear wheel 26 that contacts the floor FL shifts to produce a larger rotation with respect to the reference position of the rotational axis 33 of the front wheel 25 and rear wheel 26. Therefore, the rotational radius of the turning skateboard SB is determined on the basis of the amount of the player's horizontal shift of his/her weight.

Next explained will be the generation of musical tones by the skateboard SB. The computer device 70 keeps executing a performance tone setting program shown in FIG. 8, while executing the drive control program shown in FIG. 7 at established short periods. The performance tone setting program is started at step S20. Conducted at step S21 is an initial setting process for resetting various flags, various variable data, etc. to initial values. After the initial setting, the computer device 70 repeatedly executes a loop processes of steps S22 to S37. At step S22, by the player's operation on the operators provided on the control box 13, a desired set of automatic rhythm data and a desired set of automatic performance data are selected from among sets of automatic rhythm data and sets of automatic performance data, and from among a group of beat tone data and a group of effect tone data, a desired piece of beat tone data and a desired piece of effect tone data are selected. In a case where provided are only a set of automatic rhythm data and a set of automatic performance data, and a piece of beat tone data and a piece of effect tone data, the above selection is not necessary. At the process of step S22, moreover, desired automatic rhythm data, automatic performance data, beat tone data and effect tone data may be externally transmitted. Alternatively, a memory that stores desired automatic rhythm data, automatic performance data, beat tone data and effect tone data may be provided on the control box 13.

Next, at step S23 there are inputted a rotational speed V from the rotational speed sensor 64 and a steering angle θ from the steering angle sensor 46. Since the rotational speed V and steering angle θ to be inputted are not digitized values directly applicable to the computer device 70, the computer device 70 converts these values into directly applicable digitized values through the interface circuit provided in the computer device 70 and a program that is not shown. Then, at step S24 it is determined whether the inputted rotational speed V is a predetermined small value Vo or more in order to determine whether the skateboard SB is in motion or at a stop. If it is determined that the skateboard SB is at a stop, it is determined at step S25 whether the skateboard SB has kept being at a stop, or the skateboard SB has been running but is stopped at this moment. At the determination of step S25, more specifically, the previous result of the determination at step S24 is compared with the current result of the determination at step S24. If it is determined that the skateboard SB has kept being at a stop, "No" is given to step S25 to return to step S22. In a case where it is determined that the skateboard SB has been driven but is stopped at this moment, on the other hand, "Yes" is given to step S25 to proceed to step S26. At step S26, a pattern number RyV for specifying a rhythm pattern is at "16" (corresponding to an ending pattern). Then, the program is return to step S22. Due to the above-described processes, when the skateboard SB is at a stop, rhythm tones having the ending pattern are reproduced through a later-described process for generating rhythm tones.

When the skateboard SB starts driving to have the rotational speed V of the specified speed Vo or more, on the other hand, "Yes" is given to step S24 to conduct processes of steps S27 and later. Set at step S27 is a cornering variable TRN indicative of straight running and right or left cornering of the skateboard SB through the use of the steering angle θ. If the absolute value of the steering angle θ is less than a positive specified value θ1, the cornering variable TRN is set at "0" indicative of straight running of the skateboard SB. If the steering angle θ is equal to or more than the positive specified value θ1, the cornering variable TRN is set at "1" indicative of right cornering of the skateboard SB. If the steering angle θ is equal to or less than a negative specified value −θ1, the cornering variable TRN is set at "−1" indicative of left cornering of the skateboard SB.

The setting of the cornering variable TRN may be modified such that if a differentiated value of the steering angle θ is equal to or more than a positive specified value, the cornering variable TRN is set at "1" indicative of right cornering of the skateboard SB, if the differentiated value of the steering angle θ is less than a negative specified value, the cornering variable TRN is set at "−1" indicative of left cornering of the skateboard SB, and the cornering variable TRN is set at "0" in other cases. Furthermore, the setting of the cornering variable TRN may also be adapted such that if the product of the steering angle θ and the second power of the rotational speed V is equal to or more than the positive specified value, the cornering variable TRN is set at "1" indicative of the right cornering, if the product is less than the negative specified value, the cornering variable TRN is set at "−1" indicative of left cornering, and the cornering variable TRN is set at "0" in other cases.

Next, it is determined at step S28 whether the skateboard SB keeps running or the skateboard SB had been stopped but started running. This determination is made by comparing the previous result of the determination of step S24 with the current result of the determination of step S24. When it is determined that the skateboard SB had been stopped but started running, "Yes" is given to step S28 to proceed to step S29 where tempo data TMP indicative of a performance tempo is set at Tslow indicative of a slow performance tempo. Then, at step S30 an activation flag RUN is set at "1". The activation flag RUN set at "1" indicates that automatic rhythm and automatic performance are activated, while the activation flag RUN set at "0" indicates that automatic rhythm and automatic performance are not activated. Then, at step S31, a pattern number RyV for specifying a rhythm pattern is set at "8" (indicative of a normal pattern) to return to step S22. Due to the processes of steps S29 to S31, when the skateboard SB starts running, the performance tempo of the automatic rhythm and automatic performance is set at a slow tempo, with the rhythm pattern of automatic rhythm performance being set at normal pattern.

When it is determined that the skateboard SB keeps running, on the other hand, "No" is given to step S28 to proceed to step S32 where it is determined whether a tempo clock value TCL is set at "0". The tempo clock value TCL is a value which is cleared back to "0" at bar timings through the execution of a later-explained performance process program. Therefore, the determination process of step S32 also determines whether the tempo clock value TCL indicates a bar timing.

If it is determined that the tempo clock value TCL indicates a bar timing, "Yes" is given to step S32 to proceed to steps S33 to S37 where tempo data TMP is set to have a value indicative of more rapid performance tempo as the rotational speed V (the running speed of the skateboard SB) increases. That is, if the rotational speed V is less than a specified rotational speed V1, the tempo data TMP is set at a specified value Tslow indicative of a slow performance tempo. When the rotational speed V is equal to or more than the specified rotational speed V1 and less than a specified rotational speed V2 (V1<V2), the tempo data TMP is set at a specified value Tmid indicative of a mid-tempo. If the rotational speed V is equal to or more than the specified rotational speed V2, the tempo data TMP is set at Tfast indicative of rapid performance tempo. As a result, the performance tempo of automatic rhythm and automatic performance increases as the running speed of the skateboard SB increases. The present embodiment is designed to have three different performance tempos, however, the present embodiment may be modified to have more or two different performance tempos. Alternatively, the present embodiment may be modified such that the performance tempo varies continuously in synchronization with the running speed of the skateboard SB.

Figure 9:
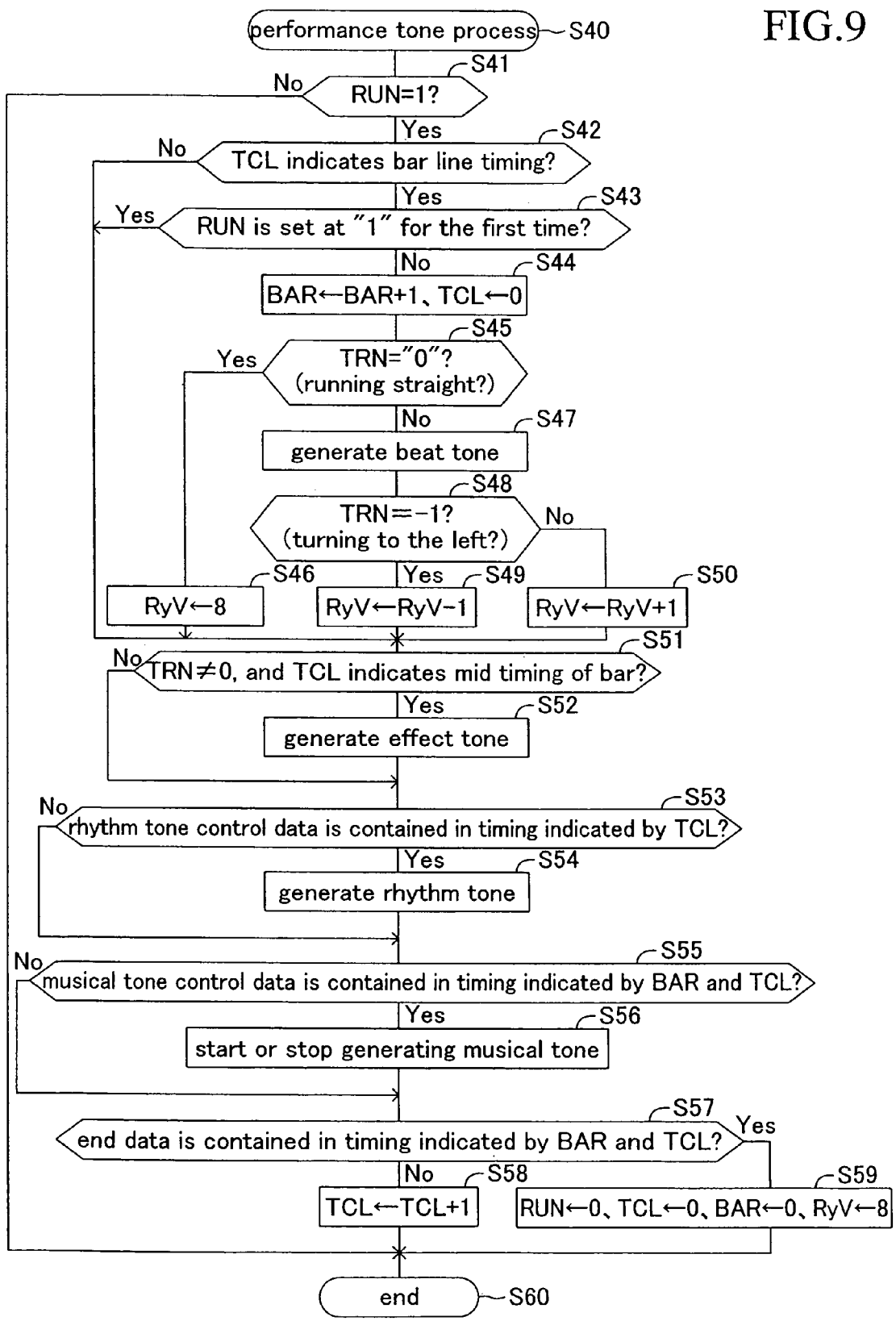
FIG. 9 is a flowchart showing a performance tone process program executed by the computer device shown in FIG. 6.
Figure 10:
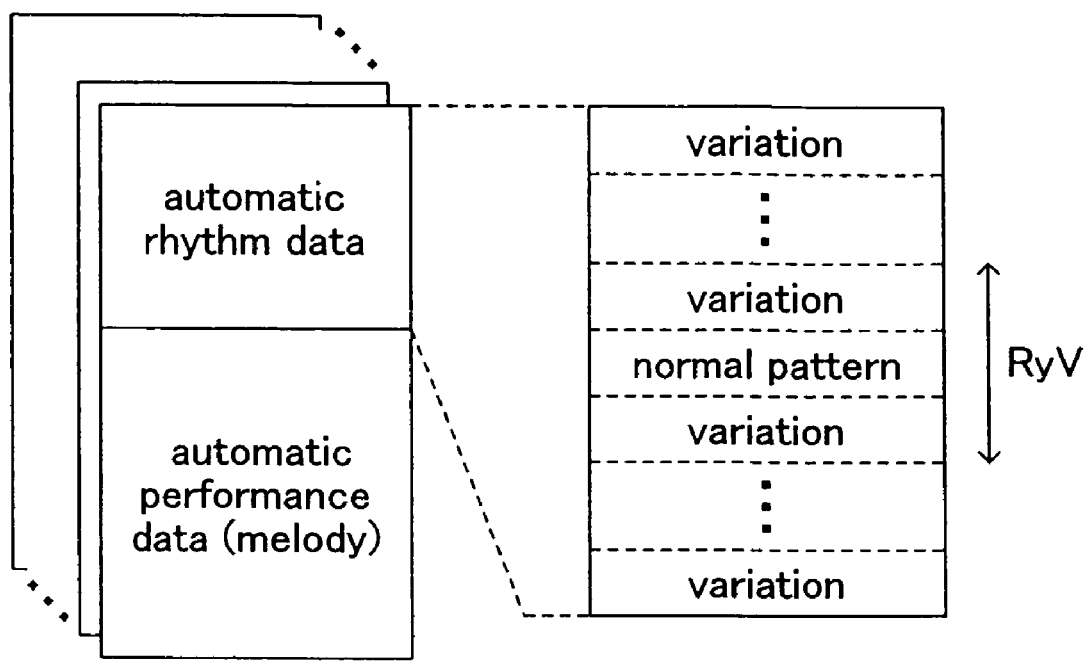
FIG. 10 is a format of data stored in a memory device shown in FIG. 6.
Figure 10:
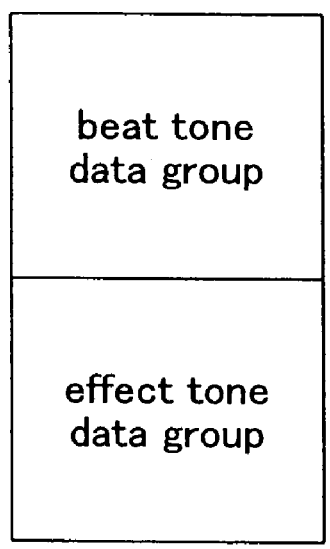

On executing the performance tone setting program, the computer device 70 repeatedly executes the performance tone process program shown in FIG. 9 at short periods specified by the tempo data TMP. Therefore, as the speed of performance tempo indicated by the tempo data TMP increases, the interval between the execution of the performance tone process program becomes shorter. The execution of performance tone process program is started at step S40, and at step S41 it is determined whether the activation flag RUN is set at "1". If the activation flag RUN is set at "0" to indicate that the automatic rhythm and automatic performance are at a halt, the execution of the performance tone process program is terminated at step S60. If the activation flag RUN is set at "1" to indicate that the automatic rhythm and automatic performance are activated, it is determined at step S42 whether the tempo clock TCL indicates a bar line timing (in this embodiment, a count value "192"). If it is determined that the tempo clock TCL does not indicate the bar line timing, the program enters step S51. If it is determined that the tempo clock TCL indicates the bar line timing, on the other hand, the program enters step S43 to determine whether the activation flag RUN is set at "1" for the first time, that is, whether the automatic rhythm and automatic performance have just started. This determination is made by comparing the previous result of the determination of step S41 with the current result of the determination of step S41. If it is determined that the activation flag RUN is turned to "1" for the first time, the program enters step S51.

At step S51 it is determined whether the cornering variable TRN is not set at "0" (in other words, the cornering variable TRN indicates that the skateboard SB is in the course of cornering) and the tempo clock value TCL indicates a mid timing of a bar (e.g., the third beat timing of a quadruple automatic rhythm and automatic performance). When the skateboard SB is not in the course of cornering, or the tempo clock value TCL does not indicate a mid timing, the program proceeds to steps S53, S54.

At step S53, reference is made to the rhythm pattern data specified by the pattern number RyV contained in the above-selected automatic rhythm data to determine whether rhythm tone control data for generating a rhythm tone (percussion tone) is contained in the timing indicated by the tempo clock value TCL. If the timing contains rhythm tone control data, the program proceeds to step S54. If not, on the other hand, the program proceeds to step S55. At step S54, the rhythm tone control data for generating a rhythm tone is supplied to the tone generator 73 to generate a rhythm tone. More specifically, the tone generator 73 generates a rhythm tone signal (percussion tone signal) indicated by the above-supplied rhythm tone control data, supplies the generated rhythm tone signal to the speakers 12a, 12b through the amplifiers 74a, 74b, and emits a rhythm tone.

At step S55 reference is made to the above-selected automatic performance data to determine whether a timing indicated by the bar count value BAR and tempo clock value TCL contains musical tone control data for starting or stopping generation of a musical tone (melody tone and accompaniment tone). If the timing contains musical tone control data, the program proceeds to step S56. If not, the program enters step S57. At step S56, the musical tone control data for starting or stopping generation of the musical tone is supplied to the tone generator 73 to start or stop generation of the musical tone. More specifically, the tone generator 73 starts or stops generating a musical tone signal (melody tone signal and accompaniment tone signal) having a tone pitch and tone color indicated by the above-supplied musical tone control data, supplies the generated musical tone signal to the speakers 12a, 12b through the amplifiers 74a, 74b, and emits the musical tone.

At step S57, reference is made to the automatic performance data to determine whether a timing indicated by the bar count value BAR and tempo clock value TCL contains end data. If the timing does not contain any end data, the program proceeds to step S58 to add "1" to the tempo clock value TCL, and further proceeds to step S60 to temporarily terminate the performance tone process program. Due to the addition of the tempo clock value TCL, the automatic rhythm and automatic performance proceed. When the performance tone process program is executed again, the above-described steps S53 to S56 control the generation of rhythm tones, melody tones and accompaniment tones. As a result, in accordance with the passage of time, rhythm tones are automatically performed along with the automatic performance of melody tones and accompaniment tones.

As time goes by, if the tempo clock value TCL indicates a bar line timing with the activation flag RUN being set at "1", "Yes" and "No" are given to steps S41, S42 and S43, respectively, to proceed to steps S44 and later. At step S44, "1" is added to the bar count value BAR, and the tempo clock value TCL is set at "0". Due to the above processes, the bar count value BAR indicates a subsequent bar of the automatic performance data, while the tempo clock value TCL indicates the top beat of the bar.

Next, at step S45 it is determined whether the cornering variable TRN is set at "0", that is, whether the skateboard SB is running straight. If it is determined that the skateboard SB is running straight, the program proceeds to step S46 to set the pattern number RyV at "8" indicative of a normal pattern. If it is determined that the skateboard SB is in the course of cornering, on the other hand, the program proceeds to step S47 where musical tone control data indicative of the beat tone which has been selected from among the beat tone data group is supplied to the tone generator 73 to generate the beat tone. The tone generator 73 then generates a beat tone signal, supplies the generated beat tone signal to the speakers 12a, 12b through the amplifiers 74a, 74b, and emits the beat tone. Due to the above processes, when the player turns the skateboard SB at a bar line timing of automatic rhythm and automatic performance, a beat tone is to be emitted.

Then at step S48 it is determined whether the cornering variable TRN is set at "−1", that is, whether the skateboard SB is turning to the left. If it is determined that the skateboard SB is turning to the left, the program proceeds to step S49 where "1" is subtracted from the pattern number RyV. If it is determined that the skateboard SB is turning to the right, on the other hand, "1" is added to the pattern number RyV at step S50. Due to the subtraction from or addition to the pattern number RyV, the rhythm pattern data for rhythm performance that has been specified by the above-described steps S53, S54 is to be switched. As a result, the player is allowed to switch the rhythm pattern of a subsequent bar between a normal pattern and variation patterns by turning the skateboard SB at a bar line timing of automatic rhythm and automatic performance. However, the switching of the pattern number RyV is done between 1 and 15, and the pattern number RyV will never be switched to "16" indicative of an ending pattern.

If the tempo clock value TCL indicates a mid timing of a bar in a state where the skateboard SB is turning to the left or right (in a state where the cornering variable TRN is not set at "0"), "Yes" is given to step S51 to proceed to step S52. At step S52, musical tone control data indicative of the effect tone that has been selected from among the effect tone data group is supplied to the tone generator 73 to generate the effect tone. More specifically, the tone generator 73 generates an effect tone signal, supplies the generated effect tone signal to the speakers 12a, 12b through the amplifiers 74a, 74b, and emits the effect tone. Due to the above processes, the player is allowed to emit an effect tone by turning the skateboard SB at a mid timing of a bar of automatic rhythm and automatic performance.

As time further goes by, if end data is read out from the automatic performance data, "Yes" is given to step S57 to proceed to step S59 where the activation flag RUN is changed to "0". The change in the activation flag RUN causes step S41 to always give "No" to terminate the automatic performance of rhythm, melody and accompaniment, substantially without executing the performance tone process program. At step S59, the tempo clock value TCL and bar count value BAR are both reset to "0", while the pattern number RyV is reset to "8" indicative of the normal pattern.

As obvious from the above explanation, the first embodiment enables the player to listen to music such as automatically performed rhythm tones, automatically performed melody tones and automatically performed accompaniment tones, while driving the skateboard SB. In addition, the first embodiment also enables the player to add variations to the music by varying the movement of the skateboard SB. More specifically, the first embodiment enables the player to vary performance tempo in accordance with the running speed of the skateboard SB, switch between rhythm patterns and emit beat tones and effect tones by turning the skateboard SB at a specified timing, allowing the player to enjoy music that is rich in variation during the ride on the skateboard SB. Furthermore, the first embodiment even makes the player feel as if the player is playing a musical instrument because the player can control the skateboard SB to generate beat tones and effect tones corresponding to the changes in driving conditions. The player can even perform music in odd meter because the progression of a musical piece is determined in accordance with the movement of the player. Since the performance in odd meter requires enhanced techniques, artistic quality of such performance is highly appreciated.

Figure 13:
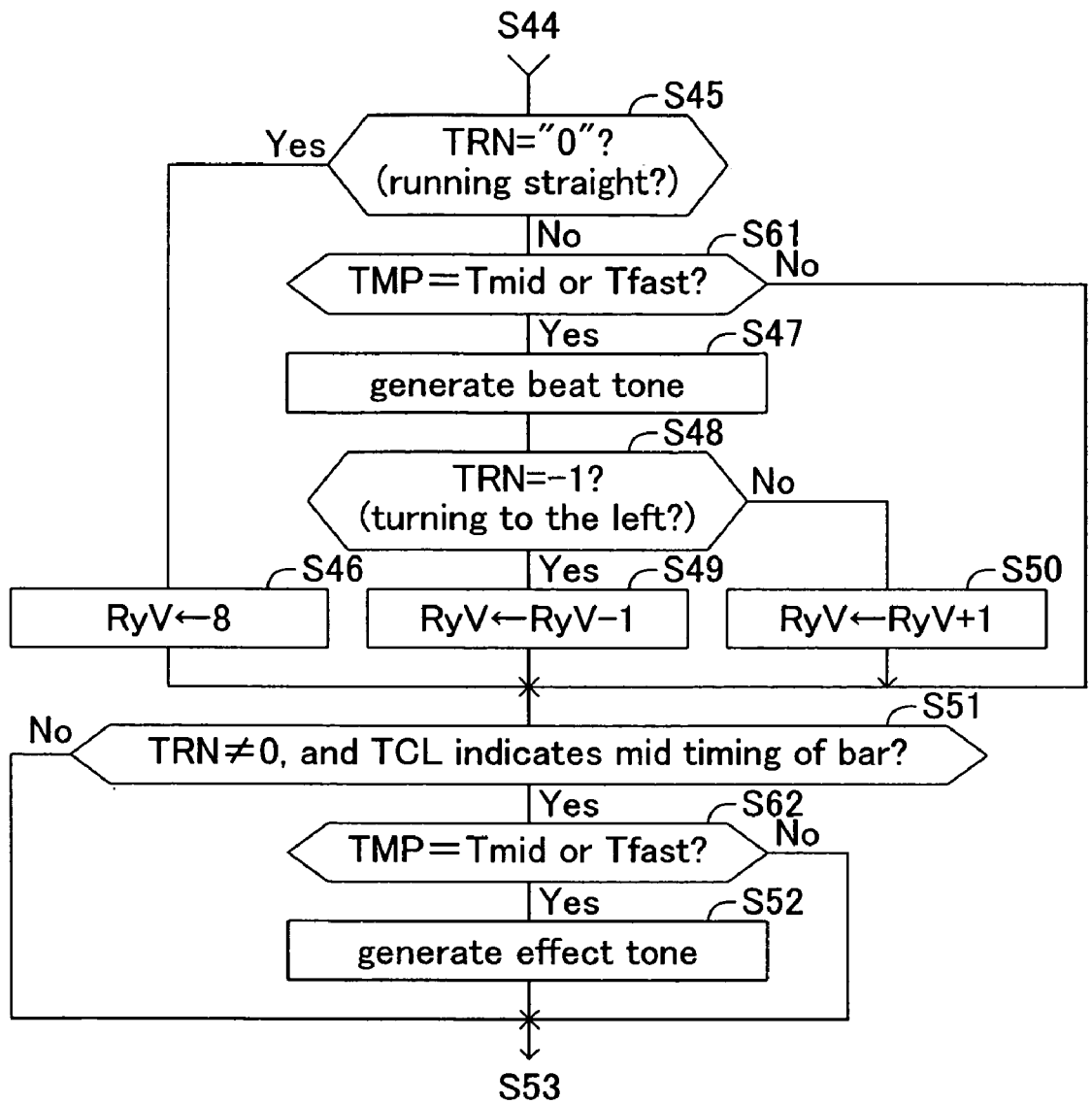
FIG. 13 is a flowchart showing modified part of the performance tone process program of FIG. 9.

Furthermore, the first embodiment can be variously modified as follows. For example, in steps S45 to S52 of the performance tone process program shown in FIG. 9 there can be added a determination process of step S61 in between step S45 and step S47 as shown in FIG. 13. At the determination process of step S61, it is determined whether the tempo data TMP is the specified value Tmid or Tfast in order to determine whether the speed of the skateboard SB is moderate or fast. Only when it is determined that the skateboard SB is running at moderate or faster speed, a beat tone is emitted, and the pattern number RyV for specifying a rhythm pattern is changed. In between step S51 and step S52, furthermore, step S62 which is similar to step S61 is added. Due to the added step S62, an effect tone is emitted only when the skateboard SB is running at moderate or faster speed.

In addition, the first embodiment is designed to determine the cornering of the skateboard SB only to the right or left, however, the first embodiment can be modified such that the cornering of the skateboard SB is divided into more pieces on the basis of the degree of the cornering. This modified embodiment may be adapted to have more vigorous rhythm patterns (e.g., rhythm patterns having more tones) as variations of automatic rhythm as the cornering of the skateboard SB becomes harder. In this case, the degree of the cornering of the skateboard SB is determined on the basis of the degree of the steering angle $\theta$. In addition to the variation of the automatic rhythm, the first embodiment can be further modified such that the automatic melody and automatic accompaniment are varied on the basis of the degree of the cornering of the skateboard SB.

In the first embodiment and its variations, furthermore, when the skateboard SB is turned at a bar line timing, a beat tone is emitted, and a rhythm pattern is changed. In addition to, or in replacement for the above, however, the automatic rhythm and automatic performance may be synchronized with the cornering of the skateboard SB when the skateboard SB is turned at positions close to a bar line timing (e.g., within one beat interval). More specifically, the tempo clock value TCL is reset to "0" at the point where the start of the cornering of the skateboard SB is sensed, that is, where the cornering variable TRN is changed from "0" to "1" or "−1". In addition, to the bar count value BAR there is added "1" if the cornering of the skateboard SB is started before a bar line timing. When the cornering of the skateboard SB is started after a bar line timing, the bar count value BAR keeps the current value.

Furthermore, the first embodiment and its variations are designed such that the modes in which musical tone signals are generated such as the switching of performance tempo and automatic rhythm pattern, and the generation of beat tones and effect tones are changed in accordance with the movement of the skateboard SB. In addition to, or in replacement for the above, however, the type of automatic performance data and the pitch, tone color and volume (amplitude envelope) of musical tones to be generated may be controlled in accordance with the movement of the skateboard SB. Furthermore, acoustic and musical effects such as reverberation, chorus, etc. to be added to generated musical tones may also be controlled in accordance with the movement of the skateboard SB. In this case, the memory device 71 may store effect control data to control acoustic and musical effects to be added to generated musical tones in accordance with the movement of the skateboard SB.

In the first embodiment, in addition, the modes for generating musical tone signals are controlled in accordance with the steering angle $\theta$ and rotational speed V (indicative of forward and backward speed) each representative of the amount of the movement of the skateboard SB. However, the first embodiment may be modified such that the modes for generating musical tone signals are controlled in accordance with the lateral acceleration, lateral speed, traveling direction, angle speed about a vertical axis line and the like of the skateboard SB in addition to, or in replacement for the above-described amount of the movement. In this case, the skateboard SB may be equipped with sensors that sense the lateral acceleration, lateral speed, traveling direction, angle speed about a vertical axis line and the like so that the output of the sensors are supplied to the computer device 70 in order to allow the computer device 70 to control the modes for generating musical tones in accordance with the lateral acceleration, lateral speed, traveling direction, angle speed and the like. In a case where the skateboard SB is provided with a forward and backward acceleration sensor, furthermore, in replacement for the rotational speed of the first embodiment, the integral of a sensed value can be used as a signal indicative of the speed of the skateboard SB. Moreover, the speed of the skateboard SB can be obtained by using an anemometer or by dividing the traveled distance obtained from positioning information of GPS by time. In a case where the skateboard SB is provided with an angle speed sensor (gyro-sensor), furthermore, in replacement for the steering angle $\theta$ of the first embodiment, the integral of a sensed value can be used as a signal indicative of the steering angle of the skateboard SB. The steering angle of the skateboard SB can be also obtained from an azimuth angle sensed by a geomagnetic sensor.

In the first embodiment as shown by broken lines in FIG. 6, furthermore, the computer device 70 is connected with a radio receiver 81 to provide the player with an operating remote box 82. The operating remote box 82 is equipped with a radio transmitter and operators on its operating panel for instructing the travel of the skateboard SB. In this case, in addition to, or in replacement for the operation by the load sensors 53, 65, the player on the skateboard SB operates the operators to instruct the forward and backward acceleration of the skateboard SB. The instruction is transmitted by radio from the operating remote box 82 and received by the radio receiver 81. The radio receiver 81 then transmits the instruction of forward and backward acceleration to the computer device 70. The computer device 70 then conducts a process similar to step S11 shown in FIG. 7 to control the rotation of the motor 58 on the basis of the instruction. On this scheme, the forward and backward acceleration of the skateboard SB is controlled by the operating remote box 82.

In the first embodiment, moreover, the steering of the skateboard SB is controlled by the lateral shifting of the player's weight. In replacement for this scheme, however, a motor-driven steering device in which at least one of the front wheel 25 and the rear wheel 26 is steered may be adopted. In this case, since the skateboard SB is steered laterally, independent of the shifting of the player's weight, it is preferable to compose at least one of the front wheel 25 and the rear wheel 26 out of a pair of side-to-side wheels in order to ensure stable driving of the skateboard SB. On this scheme, the lateral steering of the skateboard SB is also controlled by the operating remote box 82.

In the first embodiment, furthermore, the skateboard SB is driven by the motor 58 that is used as driving source. In replacement for the motor 58, however, the skateboard SB may also be adapted to be driven by human power without using the motor 58. In this case, the player may place one of his/her feet on the board 10 and kick the floor with the other foot to impart rotational force to the front wheel 25 and rear wheel 26, so that the skateboard SB can travel forward and backward.

Furthermore, the computer device 70 may be connected to a radio transmitter 83 in order to transmit musical tone signals by radio from the radio transmitter 83. In this case, the player carries a musical remote box 84 equipped with a radio receiver for receiving musical tone signals transmitted by radio. The player carrying the musical remote box 84 is able to listen to the musical tone signals received by the radio receiver with headphones 85. In addition, the first embodiment may be adapted such that operational signals of operators provided on the musical remote box 84 are transmitted by radio by an integrated radio transmitter to the computer device 70 through the radio receiver 81 in order to transmit various instructions such as selected automatic rhythm and automatic performance data to the computer device 70.

Furthermore, the first embodiment may also be adapted such that the musical remote box 84 is equipped with a computer device, memory device and tone generator for generating musical tone signals that are similar to the computer device 70, memory device 71 and tone generator 73 of the first embodiment so that musical tone signals can be generated in the musical remote box 84 in order to allow the player to listen to the generated musical tone signals with the headphones 85. In this case, the computer device 70 transmits signals indicative of the rotational speed V and steering angle θ sensed by the rotational speed sensor 64 and steering angle sensor 46 through the radio transmitter 83. The computer device disposed in the musical remote box 84 then executes the performance tone setting program shown in FIG. 8 and the performance tone process program shown in FIG. 9 that are similar to the first embodiment to reproduce music.

Figure 14:
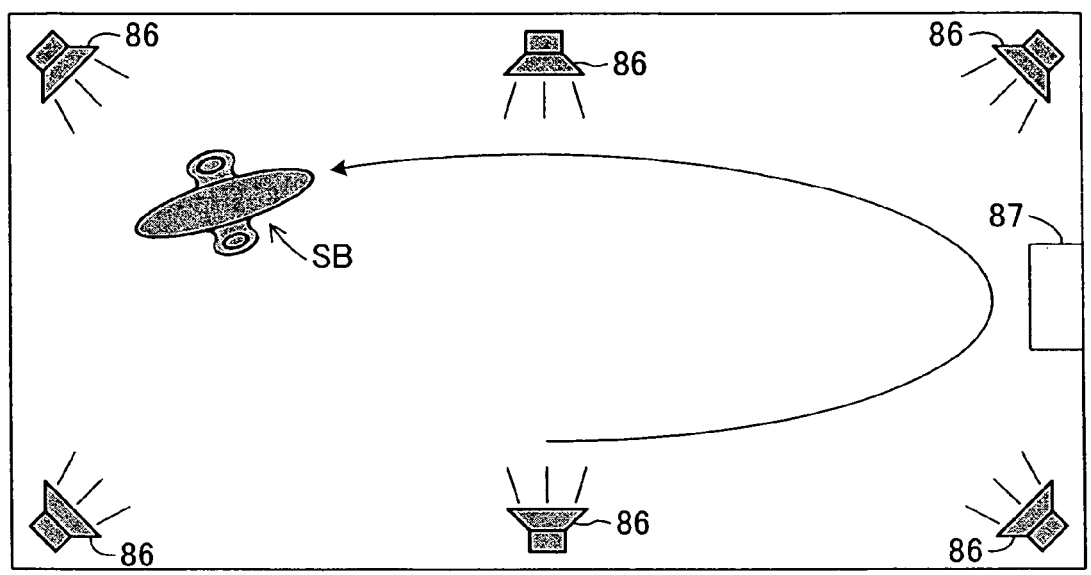
FIG. 14 is an explanatory drawing which explains a state in which the skateboard moves in a space where a plurality of speakers are disposed.

As shown in FIG. 14, furthermore, the first embodiment may also be adapted such that musical tone signals are emitted from a plurality of speakers 86 scattered in a specified space. In this case, in the space there is disposed a controller 87 that is connected to the speakers 86 and equipped with a radio receiver. As is the case with the musical remote box 84, musical tone signals received by the radio receiver are then emitted from the speakers 86. In this case as well as the case of the musical remote box 84, the controller 87 may be equipped with a radio receiver, a computer device, memory device and tone generator to allow the radio receiver to receive signals indicative of the rotational speed V and steering angle θ sensed by the rotational speed sensor 64 and steering angle sensor 46 and allow the tone generator to generate musical tone signals to supply the generated musical tone signals to the speakers 86.

In this case, furthermore, the controller 87 may also have a position sensor that senses the position of the skateboard SB and the player, so that the volume of music emitted from the speakers 86 is controlled in accordance with the sensed position in order to move the emitted music through the space in accordance with the move of the player. In this case, for example, the speakers 86 can be adapted such that the speaker 86 closest to the player emits music at a high-volume level so that the sound image travels with the position of the player.

b. Second Embodiment

Figure 15:
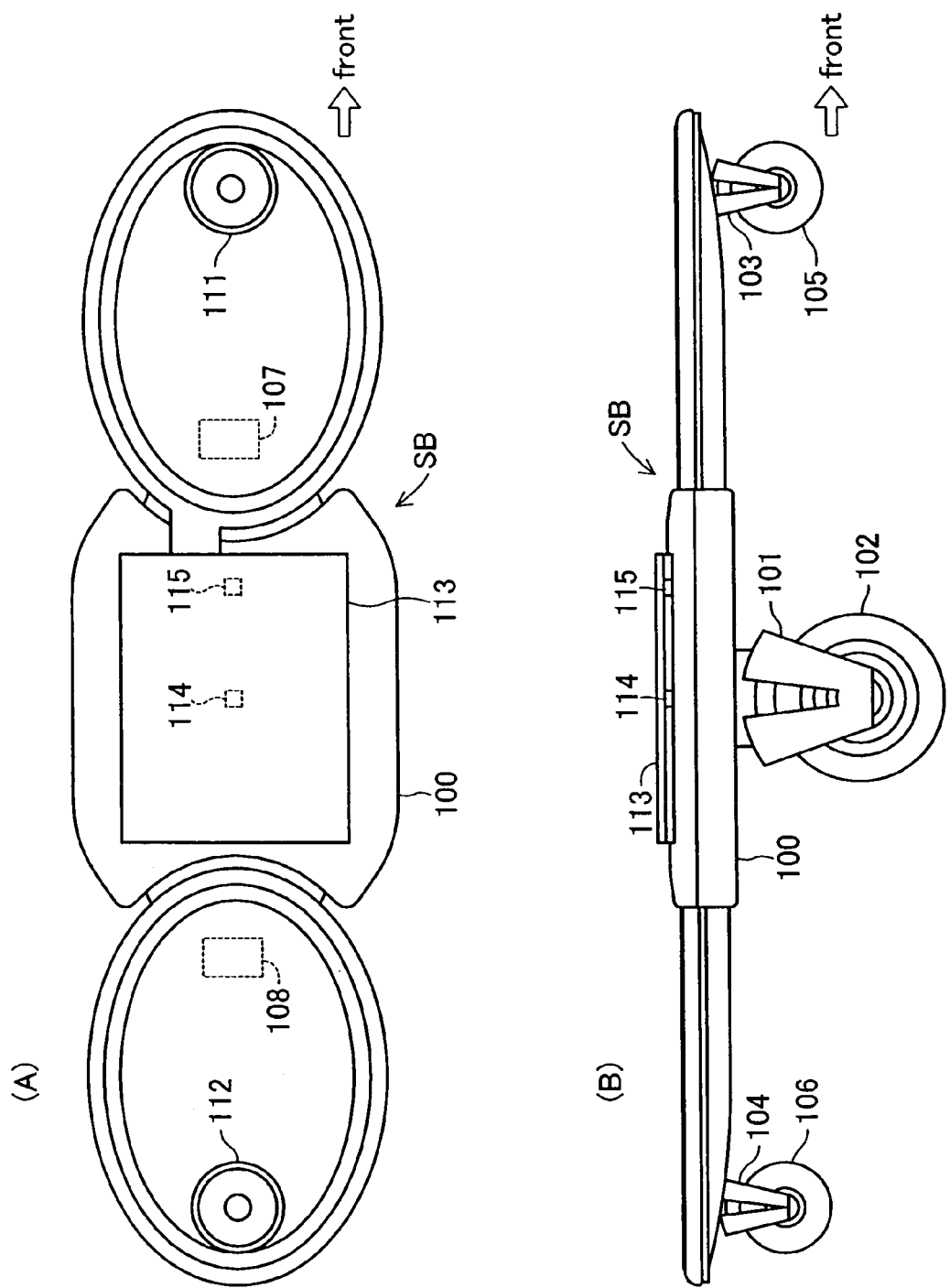
FIG. 15(A) is a top view of a skateboard according to a second embodiment.
FIG. 15(B) is a front view of the skateboard.

Next explained will be a skateboard SB according to a second embodiment of the present invention. The skateboard SB has a long board 100 as shown in a top view of FIG. 15(A) and a front view of FIG. 15(B).

On the undersurface of the central part of the board 100 there is rotatably provided a relatively big central wheel 102 with an arm 101 being interposed therebetween. The central wheel 102 is driven by a drive mechanism (not shown) which is similar to that (see FIG. 5) of the first embodiment. A rotational speed V of the central wheel 102 is sensed by a rotational speed sensor (not shown) which is similar to that of the first embodiment. On the front end and rear end of the undersurface of the board 100 there are rotatably provided a relatively small front wheel 105 and rear wheel 106 through arms 103, 104. Undersurfaces of the front wheel 105 and rear wheel 106 are positioned above the undersurface of the central wheel 102 in order to prevent the front wheel 105 and rear wheel 106 from contacting a floor at the same time.

In the front part and rear part which are close to the center of the upper surface of the board 100 there are embedded load sensors 107, 108 for sensing loads W1, W2. The second embodiment is designed such that a player places his/her feet where the load sensors 107, 108 are embedded. In the front end and rear end of the upper surface of the board 100 there are embedded speakers 111, 112 facing upward. In this case as well, the speakers 111, 112 with high directivity are preferable. Provided at the center of the board 100 is a control box 113 which is equipped with an electrical control device configured in a manner similar to that of the first embodiment. Also provided in the control box 113 in order to sense a steering angle θ are an angle speed sensor (gyro-sensor) 114 for sensing an angle speed ω about the vertical axis line of the midsection of the board 100 and an acceleration sensor 115 for sensing lateral acceleration G at the front part of the board 100. By integrating the sensed angle speed w, the steering angle θ is obtained. Then, the zero point (i.e., drift) of the obtained steering angle θ is corrected with the change in the traveling direction of the board 100 (i.e., the angle of lateral inclination of the board 100) that is calculated from the sensed lateral acceleration G. As a result, the steering angle θ similar to that of the first embodiment can be obtained for the skateboard SB of the second embodiment as well.

In the case of the skateboard SB configured as described above, as well as the case of the first embodiment, if the player places his/her feet on the load sensors 107, 108 and shifts his/her weight forward, the central wheel 102 is driven forward to accelerate forward, while if the player shifts his/her weight backward, the central wheel 102 is driven backward to accelerate backward. At the forward acceleration of the skateboard SB, the central wheel 102 and front wheel 105 contact the floor with the rear wheel 106 being levitated. At the backward acceleration, the central wheel 102 and rear wheel 106 contact the floor with the front wheel 105 being levitated. If the player shifts his/her weight to the center of the board 100, both the front wheel 105 and rear wheel 106 are levitated from the floor, with only the central wheel 102 contacting the floor to travel or stop. In this case, the player can turn the skateboard SB to the right or left by twisting his/her body to rotate the board 100 rightward or leftward about the vertical axis line with the pivotal central wheel 102.

As a result, if the electrical control device configured in a manner similar to that of the first embodiment is activated in this state, musical tone signals are generated, and the modes in which musical tone signals are generated are controlled in accordance with the movement of the skateboard SB as in the case of the first embodiment. Therefore, the second embodiment also brings about effects similar to those of the first embodiment. To the second embodiment as well, variations for the first embodiment can be also applied. In the second embodiment, furthermore, the front wheel 105 and rear wheel 106 may be omitted as long as the player can balance himself/herself in the front and rear direction and right to left direction.

c. Third Embodiment

Figure 16:
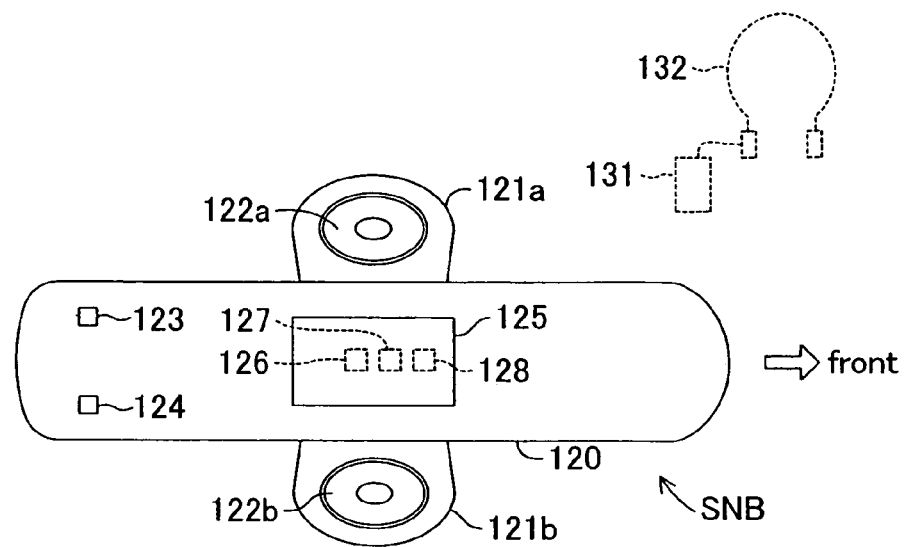
FIG. 16 is a top view of a snowboard according to a third embodiment of the present invention.

Next explained will be a third embodiment of the present invention. In the third embodiment, a snowboard SNB is adopted as a moving apparatus of the present invention. The snowboard SNB has a long board 120 as shown in FIG. 16. At the right and left sides of the midsection in the front and rear direction of the board 120, integrally formed with the board 120 are a plate-shaped pair of projections 121a, 121b extending from the board 120 diagonally upward to the right and left. The projections 121a, 121b are provided with speakers 122a, 122b, respectively, in order to emit tones upward. The speakers 122a, 122b with high directivity are preferable. In the both sides of the rear part of the board 120 there are embedded a pair of load sensors 123, 124 for respectively sensing loads Wlf, Wrf imposed in the vertical direction. In order to shift the direction of the snowboard SNB, a player shifts his/her weight rested on his/her rear foot to the right or left. By figuring out the difference between the sensed loads Wlf, Wrt, therefore, a rotational angle θs about the vertical axis of the snowboard SNB (corresponding to the steering angle θ of the first embodiment) that is nearly proportional to the difference can be obtained.

At the midsection of the upper surface of the board 120 there is provided a control box 125. In the control box 125, an acceleration sensor 126 for sensing an acceleration G in the front and rear direction of the snowboard SNB is housed. The control box 125 is equipped with a computer device 70, memory device 71, tone generator 73 and amplifiers 74a, 74b which are similar to those of the first embodiment (see FIG. 6). The computer device 70 executes the performance tone setting program shown in FIG. 8 and the performance tone process program shown in FIG. 9. In these programs, however, used in replacement for the rotational speed V is a speed Vs of the snowboard SNB obtained by integrating the acceleration G sensed by the acceleration sensor 126. Used in replacement for the steering angle θ, furthermore, is a rotational angle θs about the vertical axis of the snowboard SNB obtained through the use of the difference between the left and right loads Wlf, Wrt as described above.

In the third embodiment configured as described above, as shown in FIG. 17, the player rides down a snowy mountain on the snowboard SNB. On riding the snowboard SNB, the player can turn the snowboard SNB by shifting his/her weight rested on his/her rear foot to the right or left. In the third embodiment as well, therefore, the computer device 70 executes the performance tone setting program shown in FIG. 8 and the performance tone process program shown in FIG. 9 to generate musical tone signals and control the modes in which the musical tone signals are generated in accordance with the speed Vs of the snowboard SNB and the rotational angle θs about the vertical axis of the snowboard SNB.

Figure 17:
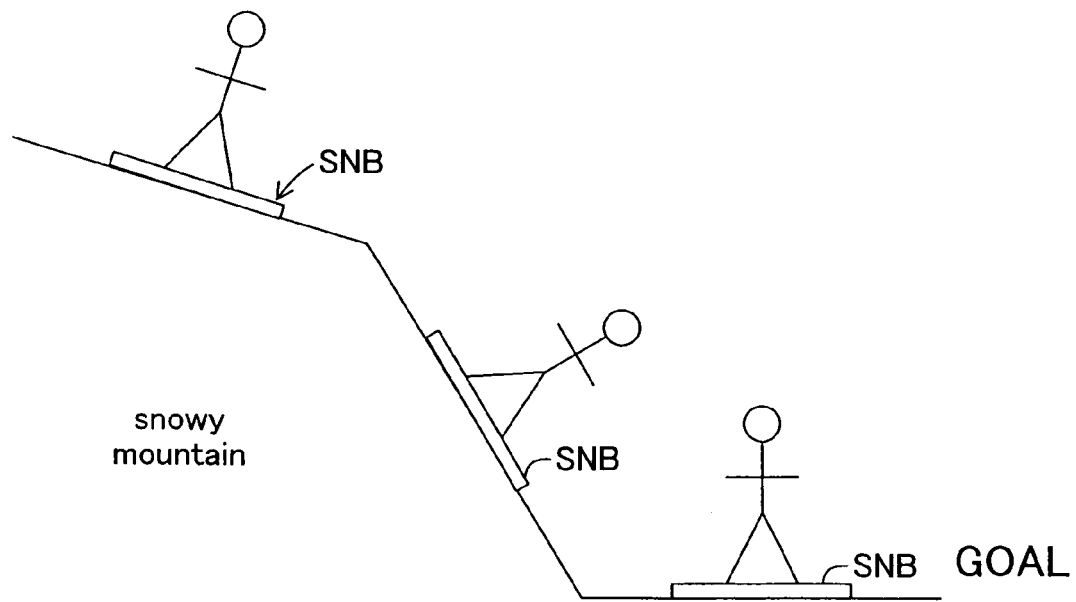
FIG. 17 is an illustration showing the travel of the snowboard.

As a result, the third embodiment enables the player to listen to music such as automatically performed rhythm tones, melody tones and accompaniment tones, while riding on the snowboard SNB. In addition, the third embodiment also enables the player to add variations to the music by changing the movement of the snowboard SNB. More specifically, the third embodiment allows the player to vary the performance tempo in accordance with the speed of the snowboard SNB, switch the rhythm pattern and generate beat tones and effect tones by turning the snowboard SNB at a specified timing. Therefore, the third embodiment allows the player to enjoy music that is rich in variation during the ride on the snowboard SNB. Furthermore, the third embodiment even makes the player feel as if the player is playing a musical instrument because the player can control the snowboard SNB to generate beat tones and effect tones corresponding to the changes in traveling conditions. Particularly, as shown in FIG. 17, when the player rides down a snowy hill which is moderate, then steep, and finally becomes flat, the third embodiment gradually changes the tempo of the automatic rhythm and automatic performance from slow tempo to quick tempo, then puts back the tempo to the slow tempo, and finally stops the automatic rhythm and automatic performance.

Furthermore, the third embodiment may also be modified such that the rotational angle θs about the vertical axis of the snowboard SNB is sensed as in the case of the second embodiment. More specifically, in replacement for the load sensors 123, 124, as in the case of the second embodiment, the third embodiment may be modified to provide the control box 125 with an angle speed sensor (gyro-sensor) 127 for sensing an angle speed ω about the vertical axis line of the midsection of the board 120 and an acceleration sensor 128 for sensing lateral acceleration G at the front part of the board 120 in order to sense the rotational angle θs about the vertical axis of the snowboard SNB on the basis of the sensors 127, 128 as in the case of the second embodiment.

In addition, as shown by broken lines in FIG. 16, in replacement for the speakers 122a, 122b, as in the case of the variation of the first embodiment, the third embodiment may be modified such that the control box 125 is equipped with a radio transmitter so that the player carrying a musical remote box 131 can listen to music with headphones 132. In this case as well, musical signals (rhythm tone signals and musical tone signals) generated in the control box 125 are transmitted by radio from the control box 125, and the musical signals received by the musical remote box 131 are supplied to the headphones 132.

Furthermore, the third embodiment may also be modified such that the musical remote box 131 is equipped with a computer device, memory device and tone generator for generating musical signals that are similar to the computer device 70, memory device 71 and tone generator 73 of the first embodiment in order to generate musical tone signals in the musical remote box 131 and enable the player to listen to the generated musical tone signals with the headphones 132. In this case, the computer device 70 transmits a signal indicative of the rotational angle θs figured out from the load Wlf or Wrf, or the loads Wlf, Wrf sensed by the load sensors 123, 124 to the musical remote box 131, while transmitting a signal indicative of the acceleration G sensed by the acceleration sensor 126 or the speed Vs which is its integral to the musical remote box 131.

In the third embodiment, the speed of the snowboard SNB is figured out by use of the acceleration G sensed by the acceleration sensor 126, however, in replacement for the acceleration sensor 126, an inclination sensor for sensing the angle of inclination with respect to the horizontal surface of the board 120 may be adopted. This scheme also brings about the effects similar to the above case, for the inclination of the snowy hill corresponds to the speed of the snowboard SNB. Furthermore, variations made for the first embodiment can be also applied to the third embodiment as well.

In carrying out the present invention, furthermore, it will be understood that the present invention is not limited to the above-described first to third embodiments and their variations, but various modifications may be made without departing from the spirit and scope of the invention. In addition to the skateboard SB and snowboard SNB, for example, the present invention can be applied to various moving apparatuses such as a surfboard, ski, snow sledge with a handle, motor cycle, bicycle, water vehicle, and in-line skate as long as they can travel by motor-power, human-power, gravitation or the like.

What is claimed is:

1. A moving apparatus which a human can ride to move, the moving apparatus comprising:
    a musical tone signal generating portion for generating a musical tone signal;
    a movement sensing portion for sensing the movement of the moving apparatus; and
    a generation mode controlling portion for controlling a mode in which the musical tone signal is generated by the musical tone signal generating portion in accordance with the sensed movement;
    wherein the moving apparatus includes at least one wheel and the movement sensing portion includes a steering angle sensor associated with the wheel.

2. A moving apparatus according to claim 1, wherein the moving apparatus moves by motor-power or human-power.

3. A moving apparatus according to claim 1, wherein the movement indicates a physical quantity relating to a speed or traveling direction of the moving apparatus.

4. A moving apparatus according to claim 3, wherein the physical quantity includes at least one of a steering angle, forward and backward acceleration, lateral acceleration, forward and backward speed, lateral speed, traveling direction, and angle speed of the moving apparatus.

5. A moving apparatus which a human can ride to move, the moving apparatus comprising:
    a musical tone signal generating portion for generating a musical tone signal;
    a movement sensing portion for sensing the movement of the moving apparatus; and
    a generation mode controlling portion for controlling a mode in which the musical tone signal is generated by the musical tone signal generating portion in accordance with the sensed movement;
    wherein the movement sensing portion senses a speed of the moving apparatus, and the generation mode controlling portion changes the mode in which the musical tone signal is generated by the musical tone signal generating portion when the sensed speed is less than an predetermined value.

6. A moving apparatus according to claim 1, wherein the musical tone signal generating portion automatically generates a series of musical tone signals on the basis of a series of performance data, and the generation mode controlling portion changes a mode in which the series of musical tone signals are generated in accordance with the sensed movement.

7. A moving apparatus which a human can ride to move, the moving apparatus comprising:
    a musical tone signal generating portion for generating a musical tone signal;
    a movement sensing portion for sensing the movement of the moving apparatus; and
    a generation mode controlling portion for controlling a mode in which the musical tone signal is generated by the musical tone signal generating portion in accordance with the sensed movement;
    wherein the musical tone signal generating portion automatically generates a series of musical tone signals on the basis of a series of performance data, and the generation mode controlling portion changes a mode in which the series of musical tone signals are generated in accordance with the sensed movement; and
    wherein the series of performance data is a series of rhythm data.

8. A moving apparatus which a human can ride to move, the moving apparatus comprising:
    a musical tone signal generating portion for generating a musical tone signal;
    a movement sensing portion for sensing the movement of the moving apparatus; and
    a generation mode controlling portion for controlling a mode in which the musical tone signal is generated by the musical tone signal generating portion in accordance with the sensed movement;
    wherein the musical tone signal generating portion automatically generates a series of musical tone signals on the basis of a series of performance data, and the generation mode controlling portion changes a mode in which the series of musical tone signals are generated in accordance with the sensed movement; and
    wherein the mode to be changed includes at least either one of a tempo of automatic performance and switching of the series of performance data.

9. A moving apparatus which a human can ride to move, the moving apparatus comprising:
    a musical tone signal generating portion for generating a musical tone signal;
    a movement sensing portion for sensing the movement of the moving apparatus; and
    a generation mode controlling portion for controlling a mode in which the musical tone signal is generated by the musical tone signal generating portion in accordance with the sensed movement;
    wherein the musical tone signal generating portion automatically generates a series of musical tone signals on the basis of a series of performance data, and the generation mode controlling portion changes a mode in which the series of musical tone signals are generated in accordance with the sensed movement; and
    wherein the generation mode controlling portion switches the series of performance data when the sensed movement represents a cornering of the moving apparatus.

10. A moving apparatus according to claim 1, wherein the generation mode controlling portion controls generation of a musical tone signal by the musical tone signal generating portion on the basis of the sensed movement.

11. A moving apparatus according to claim 1, wherein the generation mode controlling portion controls the musical tone signal generating portion to generate a beat tone or an effect tone when the sensed movement represents a cornering of the moving apparatus.

12. A moving apparatus which a human can ride to move, the moving apparatus comprising:
    a musical tone signal generating portion for generating a musical tone signal;
    a movement sensing portion for sensing the movement of the moving apparatus; and a generation mode controlling portion for controlling a mode in which the musical tone signal is generated by the musical tone signal generating portion in accordance with the sensed movement;

wherein the musical tone signal generating portion automatically generates a series of musical tone signals on the basis of a series of performance data, and the generation mode controlling portion controls generation of a musical tone signal by the musical tone signal generating portion when the sensed movement is changed at an predetermined timing during automatically generating the series of musical tone signals.

13. A moving apparatus according to claim 1, wherein the generation mode controlling portion controls a musical tone element of the musical tone signal generated by the musical tone signal generating portion on the basis of the sensed movement.

14. A moving apparatus according to claim 13, wherein the musical tone element includes at least one of a tone pitch of the musical tone signal, a tone color of the musical tone signal, tone volume of the musical tone signal and an effect to be added to the musical tone signal.

15. A moving apparatus system having a moving apparatus which a human can ride to move and an electronic musical apparatus which is disposed apart from the moving apparatus and includes a musical tone signal generating portion for generating a musical tone signal, wherein:

the moving apparatus is provided with a movement sensing portion for sensing the movement of the moving apparatus, and a transmitting portion for transmitting a signal indicative of the sensed movement; and the electronic musical apparatus is provided with a generation mode controlling portion for receiving the signal transmitted from the transmitting portion and controlling, on the basis of the received signal, a mode in which the musical tone signal is generated by the musical tone signal generating portion in accordance with the sensed movement;

wherein the moving apparatus includes at least one wheel and the movement sensing portion includes a steering angle sensor associated with the wheel.

16. A moving apparatus system according to claim 15, wherein the moving apparatus moves by motor-power or human-power.

17. A moving apparatus system according to claim 15, wherein the movement indicates a physical quantity relating to a speed or traveling direction of the moving apparatus.

18. A moving apparatus system according to claim 17, wherein the physical quantity includes at least one of a steering angle, forward and backward acceleration, lateral acceleration, forward and backward speed, lateral speed, traveling direction, and angle speed of the moving apparatus.

19. A moving apparatus system having a moving apparatus which a human can ride to move and an electronic musical apparatus which is disposed apart from the moving apparatus and includes a musical tone signal generating portion for generating a musical tone signal, wherein:

the moving apparatus is provided with a movement sensing portion for sensing the movement of the moving apparatus, and a transmitting portion for transmitting a signal indicative of the sensed movement; and the electronic musical apparatus is provided with a generation mode controlling portion for receiving the signal transmitted from the transmitting portion and controlling, on the basis of the received signal, a mode in which the musical tone signal is generated by the musical tone signal generating portion in accordance with the sensed movement;

wherein the movement sensing portion senses a speed of the moving apparatus, and the generation mode controlling portion changes the mode in which the musical tone signal is generated by the musical tone signal generating portion when the sensed speed is less than an predetermined value.

20. A moving apparatus system according to claim 15, wherein the musical tone signal generating portion automatically generates a series of musical tone signals on the basis of a series of performance data, and the generation mode controlling portion changes a mode in which the series of musical tone signals are generated in accordance with the sensed movement.

21. A moving apparatus system having a moving apparatus which a human can ride to move and an electronic musical apparatus which is disposed apart from the moving apparatus and includes a musical tone signal generating portion for generating a musical tone signal, wherein:

the moving apparatus is provided with a movement sensing portion for sensing the movement of the moving apparatus, and a transmitting portion for transmitting a signal indicative of the sensed movement; and the electronic musical apparatus is provided with a generation mode controlling portion for receiving the signal transmitted from the transmitting portion and controlling, on the basis of the received signal, a mode in which the musical tone signal is generated by the musical tone signal generating portion in accordance with the sensed movement;

wherein the musical tone signal generating portion automatically generates a series of musical tone signals on the basis of a series of performance data, and the generation mode controlling portion changes a mode in which the series of musical tone signals are generated in accordance with the sensed movement, and wherein the series of performance data is a series of rhythm data.

22. A moving apparatus system having a moving apparatus which a human can ride to move and an electronic musical apparatus which is disposed apart from the moving apparatus and includes a musical tone signal generating portion for generating a musical tone signal, wherein:

the moving apparatus is provided with a movement sensing portion for sensing the movement of the moving apparatus, and a transmitting portion for transmitting a signal indicative of the sensed movement; and the electronic musical apparatus is provided with a generation mode controlling portion for receiving the signal transmitted from the transmitting portion and controlling, on the basis of the received signal, a mode in which the musical tone signal is generated by the musical tone signal generating portion in accordance with the sensed movement;

wherein the musical tone signal generating portion automatically generates a series of musical tone signals on the basis of a series of performance data, and the generation mode controlling portion changes a mode in which the series of musical tone signals are generated in accordance with the sensed movement; and wherein the mode to be changed includes at least either one of a tempo of automatic performance and switching of the series of performance data.

23. A moving apparatus system having a moving apparatus which a human can ride to move and an electronic musical apparatus which is disposed apart from the moving apparatus and includes a musical tone signal generating portion for generating a musical tone signal, wherein:
the moving apparatus is provided with
a movement sensing portion for sensing the movement at the moving apparatus, and
a transmitting portion for transmitting a signal indicative of the sensed movement; and
the electronic musical apparatus is provided with
a generation mode controlling portion for receiving the signal transmitted from the transmitting portion and controlling, on the basis of the received signal, a mode in which the musical tone signal is generated by the musical tone signal generating portion in accordance with the sensed movement;
wherein the musical tone signal generating portion automatically generates a series of musical tone signals on the basis of a series of performance data, and the generation mode controlling portion changes a mode in which the series of musical tone signals are generated in accordance with the sensed movement; and
wherein the generation mode controlling portion switches the series of performance data when the sensed movement represents a cornering of the moving apparatus.

24. A moving apparatus system according to claim 15, wherein the generation mode controlling portion controls generation of a musical tone signal by the musical tone signal generating portion on the basis of the sensed movement.

25. A moving apparatus system according to claim 15, wherein the generation mode controlling portion controls the musical tone signal generating portion to generate a beat tone or an effect tone when the sensed movement represents a cornering of the moving apparatus.

26. A moving apparatus system having a moving apparatus which a human can ride to move and an electronic musical apparatus which is disposed apart from the moving apparatus and includes a musical tone signal generating portion for generating a musical tone signal, wherein:
the moving apparatus is provided with
a movement sensing portion for sensing the movement of the moving apparatus, and
a transmitting portion for transmitting a signal indicative of the sensed movement; and
the electronic musical apparatus is provided with
a generation mode controlling portion for receiving the signal transmitted from the transmitting portion and controlling, on the basis of the received signal, a mode in which the musical tone signal is generated by the musical tone signal generating portion in accordance with the sensed movement;
wherein the musical tone signal generating portion automatically generates a series of musical tone signals on the basis of a series of performance data, and the generation mode controlling portion controls generation of a musical tone signal by the musical tone signal generating portion when the sensed movement is changed at an predetermined timing during automatically generating the series of musical tone signals.

27. A moving apparatus system according to claim 15, wherein the generation mode controlling portion controls a musical tone element of the musical tone signal generated by the musical tone signal generating portion on the basis of the sensed movement.

28. A moving apparatus system according to claim 27, wherein the musical tone element includes at least one of a tone pitch of the musical tone signal, a tone color of the musical tone signal, tone volume of the musical tone signal and an effect to be added to the musical tone signal.

* * * * *